United States Patent
Myers et al.

(10) Patent No.: US 8,676,385 B2
(45) Date of Patent: Mar. 18, 2014

(54) METHOD FOR OPERATING A HEAT EXCHANGER UNIT

(75) Inventors: Jacob P. Myers, East Berlin, PA (US); Mark S. Huber, Sykesville, MD (US)

(73) Assignee: EVAPCO, Inc., Westminster, MD (US)

( * ) Notice: Subject to any disclaimer, the term of this patent is extended or adjusted under 35 U.S.C. 154(b) by 456 days.

(21) Appl. No.: 13/091,809

(22) Filed: Apr. 21, 2011

(65) Prior Publication Data

US 2012/0267091 A1    Oct. 25, 2012

(51) Int. Cl.
*G01M 1/38* (2006.01)
*G05B 13/00* (2006.01)
*G05D 15/00* (2006.01)

(52) U.S. Cl.
USPC ........... 700/276; 700/300; 165/279; 165/281; 165/287; 165/293

(58) Field of Classification Search
None
See application file for complete search history.

(56) References Cited

U.S. PATENT DOCUMENTS

| | | | | |
|---|---|---|---|---|
| 4,380,156 | A | * | 4/1983 | Ecker ........................... 62/235.1 |
| 5,592,059 | A | * | 1/1997 | Archer ...................... 318/400.08 |
| 7,310,958 | B2 | | 12/2007 | Carter et al. |

* cited by examiner

*Primary Examiner* — Sean Shechtman
(74) *Attorney, Agent, or Firm* — Rader, Fishman & Grauer PLLC

(57) ABSTRACT

A method operates a heat exchanger unit and determines a current physical characteristic of a process fluid at or adjacent a process fluid outlet of the heat exchanger unit and predetermining a desired physical characteristic of the process fluid at which the process fluid is desired to exit the heat exchanger unit. If the current physical characteristic of the process fluid is greater than the desired physical characteristic of the process fluid, then either a current fan speed is incrementally increased or the current fan speed is set at a predetermined low set point fan speed. Alternatively, if the current physical characteristic of the process fluid is less than the desired physical characteristic of the process fluid, then either the current fan speed is incrementally decreased or the current fan speed is set at a predetermined high set point fan speed or an OFF operating mode is activated.

10 Claims, 29 Drawing Sheets

```
┌──────────────┐ ┌──────────────┐
│25 Horsepower │ │7.5 Horsepower│
│  Fan Motor   │ │ Pump Motor   │
│    ⌀         │ │     ⊗        │                               38
└──────────────┘ └──────────────┘                                /
```

```
                        USER INPUT
         Press one:  ┌──────────┐  ┌──────────┐
                     │Water Sav.│  │Energy Sav│
                     │ Priority │  │ Priority │
                     └──────────┘  └──────────┘
   TOT (target outlet temperature)           95.0    °F
   DBT (dead band temperature)                0.2    °F
   DOT (desired outlet temperature)   94.8 °F to 95.2 °F
   FAN SPEED (rpm)
      Full Speed                               197    rpm
      Operating Mode
         In a Water Savings Priority Condition
            DRY (A)
               A2 - High Set Point        100% of Full Speed
               A1 - Low Set Point          20% of Full Speed
            EVAPORATIVE (B)
               B2 - High Set Point        100% of Full Speed
               B1 - Low Set Point          20% of Full Speed
         In an Energy Savings Priority Condition
            DRY (Y)
               Y2 - High Set Point        100% of Full Speed
               Y1 - Low Set Point          20% of Full Speed
            EVAPORATIVE (Z)
               Z2 - High Set Point        100% of Full Speed
               Z1 - Low Set Point          20% of Full Speed
         OFF                                     0    rpm
                           [Enter]
```

FIG. 8

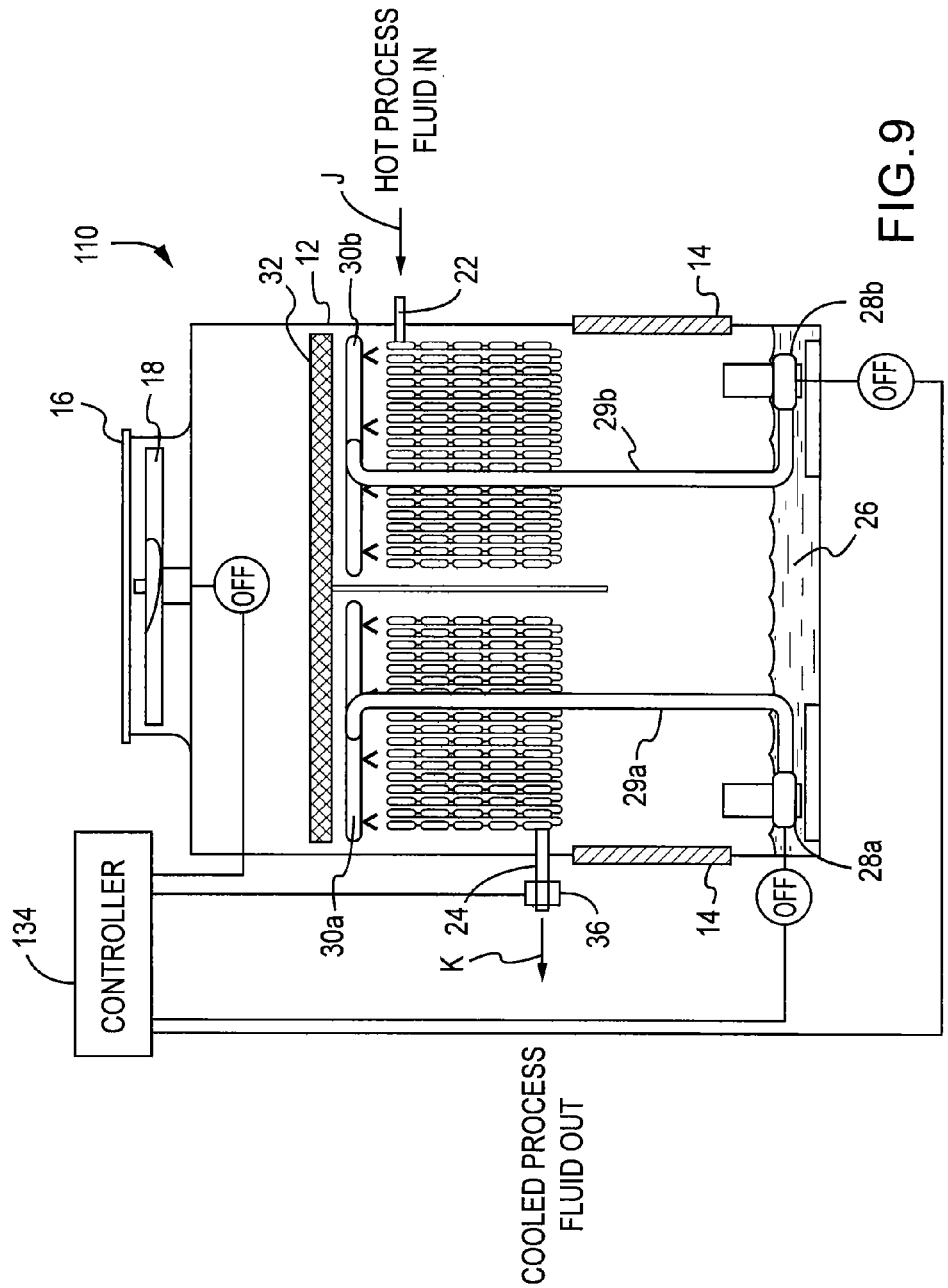

```
┌──────────────┐  ┌──────────────────┐
│ 30 Horsepower│  │  4 Horsepower    │
│  Fan Motor   │  │(Total) Pump Motors│
│      ⊂⊃      │  │        ⊗         │                    38
└──────┬───────┘  └────────┬─────────┘
```

USER INPUT

| | |
|---|---|
| TOT (target outlet temperature) | 95.0 °F |
| DBT (dead band temperature) | 0.2 °F |
| DOT (desired outlet temperature) | 94.8 °F to 95.2 °F |
| FAN SPEED (rpm) | |
|    Full Speed | 427 rpm |
|    Operating Mode | |
|      DRY (J) | |
|        J2 - High Set Point | 100% of Full Speed |
|        J1 - Low Set Point | 20% of Full Speed |
|      WATER EFFICIENT (K) | |
|        K2 - High Set Point | 100% of Full Speed |
|        K1 - Low Set Point | 20% of Full Speed |
|      EVAPORATIVE (L) | |
|        L2 - High Set Point | 100% of Full Speed |
|        L1 - Low Set Point | 20% of Full Speed |
|      OFF | 0 rpm |

[Enter]

FIG. 15

```
┌──────────────────┐  ┌──────────────────┐
│  20 Horsepower   │  │  10 Horsepower   │
│    Fan Motor     │  │(Total) Pump Motors│
│       ⌇⌇         │  │        ⊗         │
└──────────────────┘  └──────────────────┘
```
                                                                    ⎯38

USER INPUT

Select one:  [Water Savings Priority]   [Energy Savings Priority]

| | |
|---|---|
| TOT (target outlet temperature) | 95.0 °F |
| DBT (dead band temperature) | 0.2 °F |
| DOT (desired outlet temperature) | 94.8 °F to 95.2 °F |

FAN SPEED (rpm)
    Full Speed                           311 rpm

Operating Mode
        In an Energy Savings Priority Condition

| | |
|---|---|
| DRY (D) | |
|     D2 - High Set Point | 60% of Full Speed |
|     D1 - Low Set Point | 20% of Full Speed |
| WATER EFFICIENT (E) | |
|     E2 - High Set Point | 55% of Full Speed |
|     E1 - Low Set Point | 25% of Full Speed |
| EVAPORATIVE (F) | |
|     F2 - High Set Point | 100% of Full Speed |
|     F1 - Low Set Point | 40% of Full Speed |

In a Water Savings Priority Condition

| | |
|---|---|
| DRY (R) | |
|     R2 - High Set Point | 100% of Full Speed |
|     R1 - Low Set Point | 20% of Full Speed |
| WATER EFFICIENT (S) | |
|     S2 - High Set Point | 100% of Full Speed |
|     S1 - Low Set Point | 20% of Full Speed |
| EVAPORATIVE (T) | |
|     T2 - High Set Point | 100% of Full Speed |
|     T1 - Low Set Point | 20% of Full Speed |
| OFF | 0 rpm |

[Enter]

FIG. 17

| 50 Horsepower Fan Motor | 5 Horsepower Pump Motor |
|---|---|

38

USER INPUT

| | |
|---|---|
| TOP (target outlet pressure) | 200.0 psi |
| DBP (dead band presssure) | 1.0 psi |
| DOP (desired outlet pressure) | 199.0 psi to 201.0 psi |
| FAN SPEED (rpm) | |
|     Full Speed | 288 rpm |
|     Operating Mode | |
|         DRY (O) | |
|             O2 - High Set Point | 100% of Full Speed |
|             O1 - Low Set Point | 20% of Full Speed |
|         EVAPORATIVE (Q) | |
|             Q2 - High Set Point | 100% of Full Speed |
|             Q1 - Low Set Point | 20% of Full Speed |
|     OFF | 0 rpm |

Enter

FIG. 20

METHOD FOR OPERATING A HEAT EXCHANGER UNIT

FIELD OF THE INVENTION

The present invention relates to a method for operating a heat exchanger unit. More particularly, the present invention is directed to a method for operating an evaporative heat exchanger unit.

BACKGROUND OF THE INVENTION

Evaporative heat exchangers are well known in the art and are particularly utilized in a variety of commercial and industrial applications. Some users of evaporative heat exchangers demand certain performance requirements. For instance, one user might require that the outlet temperature of the process fluid flowing out of the evaporative heat exchanger be, say, 87° Fahrenheit plus or minus, say, 0.75° Fahrenheit. Thus, to be competitive, manufacturers of evaporative heat exchangers must provide a way to control and maintain the outlet temperature of the process fluid as required by the user. One way to control and maintain the outlet temperature of a conventional heat exchanger is disclosed in U.S. Pat. No. 7,310,958 to Carter et al.

The Carter patent teaches a method of controlling the operation of a heat exchanger that has a dry, non-evaporative section and an evaporative section. The method includes the steps of sensing whether a water spray is on in the evaporative section, establishing that the water spray is on and comparing fan output to a predetermined energy switch fan output. If the fan output exceeds the predetermined energy switch fan output, the method compares the outlet fluid temperature to a predetermined set point temperature and reduces fan output if the outlet fluid temperature is less than the set point temperature. The method also senses whether the water spray is on and establishes that the water spray is on, compares fan output to a predetermined energy switch fan output and sets the fan speed to about equal the energy switch fan output, compares the outlet fluid temperature to a predetermined set point temperature and reduces fluid flow to the evaporative section if the outlet fluid temperature is less than the set point temperature.

SUMMARY OF THE INVENTION

One embodiment of a method of the present invention operates a conventional heat exchanger unit having a process fluid flowing through it. The heat exchanger unit has a pump and a fan rotatable in a range of fan speeds and the heat exchanger unit is operable in an OFF operating mode, in a DRY operating mode and an EVAPORATIVE operating mode. In the OFF operating mode, both the pump and the fan are in an OFF state. In the DRY operating mode, the fan is in an ON state and the pump is in the OFF state. In the EVAPORATIVE operating mode, both the fan and the pump are in the ON state. One step of the method is determining a current physical characteristic of the process fluid at or adjacent a process fluid outlet of the heat exchanger unit. The current physical characteristic of the process fluid includes a current outlet temperature or current outlet pressure. Another step of the method is predetermining a desired physical characteristic of the process fluid at which the process fluid is targeted to exit the heat exchanger unit. The desired physical characteristic of the process fluid includes a desired outlet temperature or a desired outlet pressure. Yet another step is determining if the current physical characteristic of the process fluid is greater than the desired physical characteristic of the process fluid or if the current physical characteristic of the process fluid is less than the desired physical characteristic of the process fluid.

If the current physical characteristic of the process fluid is greater than the desired physical characteristic of the process fluid, then either a current fan speed is incrementally increased or the current fan speed is set at a predetermined low set point fan speed. Alternatively, if the current physical characteristic of the process fluid is less than the desired physical characteristic of the process fluid, then either the current fan speed is incrementally decreased or the current fan speed is set at a predetermined high set point fan speed or the OFF operating mode is activated. The predetermined high set point fan speed is larger than the predetermined low set point fan speed.

Another embodiment of the method of the present invention operates a different type of a heat exchanger unit with the process fluid flowing through it. The different-type heat exchanger unit has a first pump, a second pump and the fan rotatable in a range of fan speeds. The different-type heat exchanger unit is operable in an OFF operating mode, a DRY operating mode, an EVAPORATIVE operating mode and a WATER EFFICIENT operating mode. In the OFF operating mode, the first pump, the second pump and the fan are in an OFF state. In the DRY operating mode, the fan is in an ON state and the first pump and the second pump are in the OFF state. In the EVAPORATIVE operating mode, the fan, the first pump and the second pump are in the ON state. And, in the WATER EFFICIENT operating mode, the fan and the first pump are in the ON state and the second pump is in the OFF state.

The method of the present invention will be better appreciated in view of the detailed description of the exemplary embodiments of the present invention with reference to the accompanying drawings, in which:

BRIEF DESCRIPTION OF THE DRAWINGS

FIG. 8 is a diagrammatical view of an exemplary interface with a list of operating parameters of the heat exchanger unit to implement the second embodiment of the method of the present invention.

FIG. 9 is a diagrammatical view of a different heat exchanger unit in an OFF operating mode incorporating a third exemplary embodiment of the method of the present invention.

FIG. 15 is a diagrammatical view of an exemplary interface with a list of operating parameters of the different heat exchanger unit to implement the third embodiment of the method of the present invention.

FIG. 17 is a diagrammatical view of an exemplary interface with a list of operating parameters of the different heat exchanger unit to implement the fourth embodiment of the method of the present invention.

FIG. 20 is a diagrammatical view of an exemplary interface with a list of operating parameters of the conventional heat exchanger unit to implement the fifth exemplary embodiment of the method of the present invention.

DETAILED DESCRIPTION OF THE EXEMPLARY EMBODIMENTS

Hereinafter, embodiments of the present invention will be described with reference to the attached drawings. The structural components or method steps common to those of the prior art and the structural components or method steps common to the respective embodiments of the present invention will be represented by the same symbols and reference numbers and repeated description thereof will be omitted.

Figure 1:
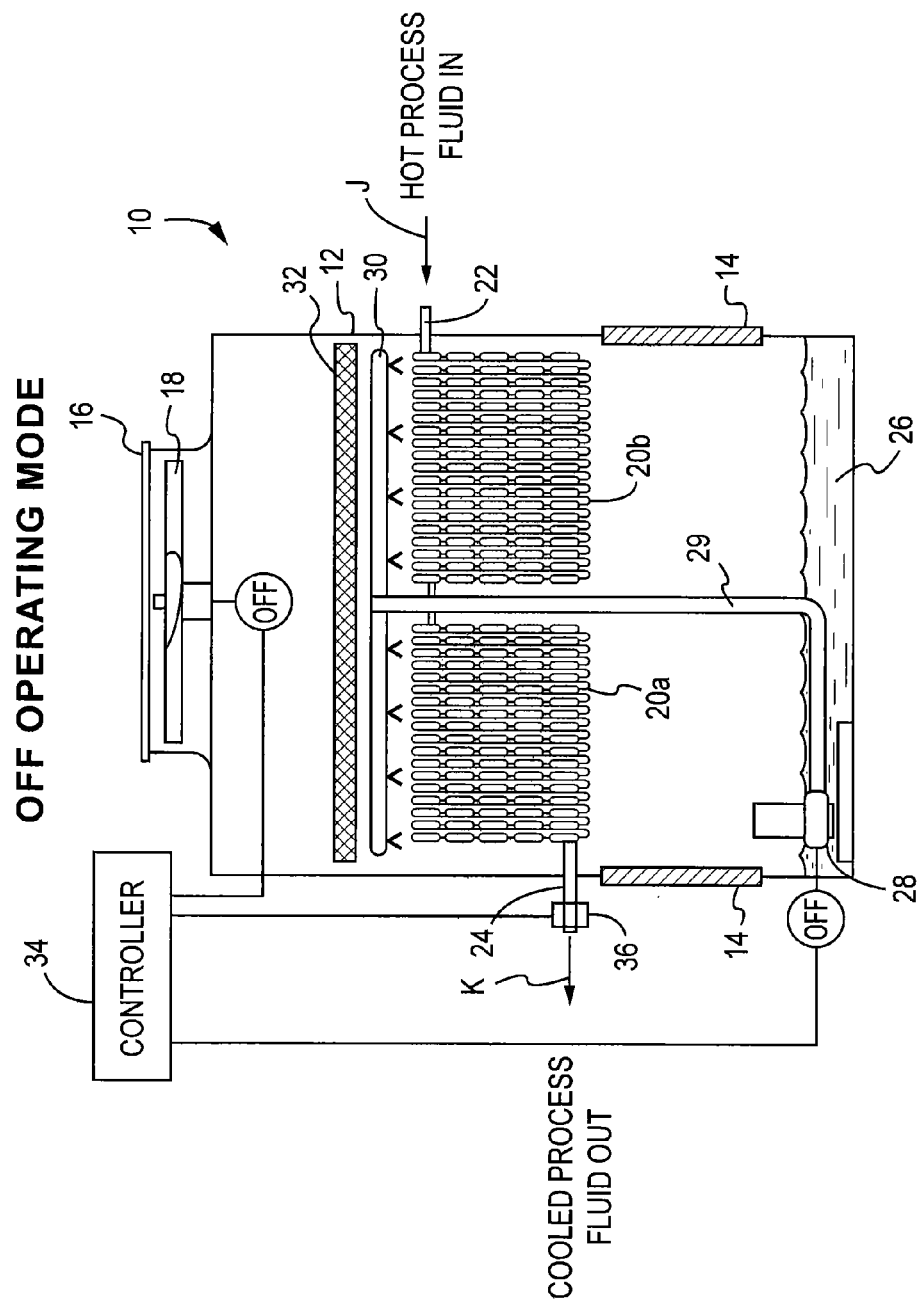
FIG. 1 is a diagrammatical view of a conventional heat exchanger unit in an OFF operating mode incorporating a first exemplary embodiment of a method of the present invention.
Figure 2:
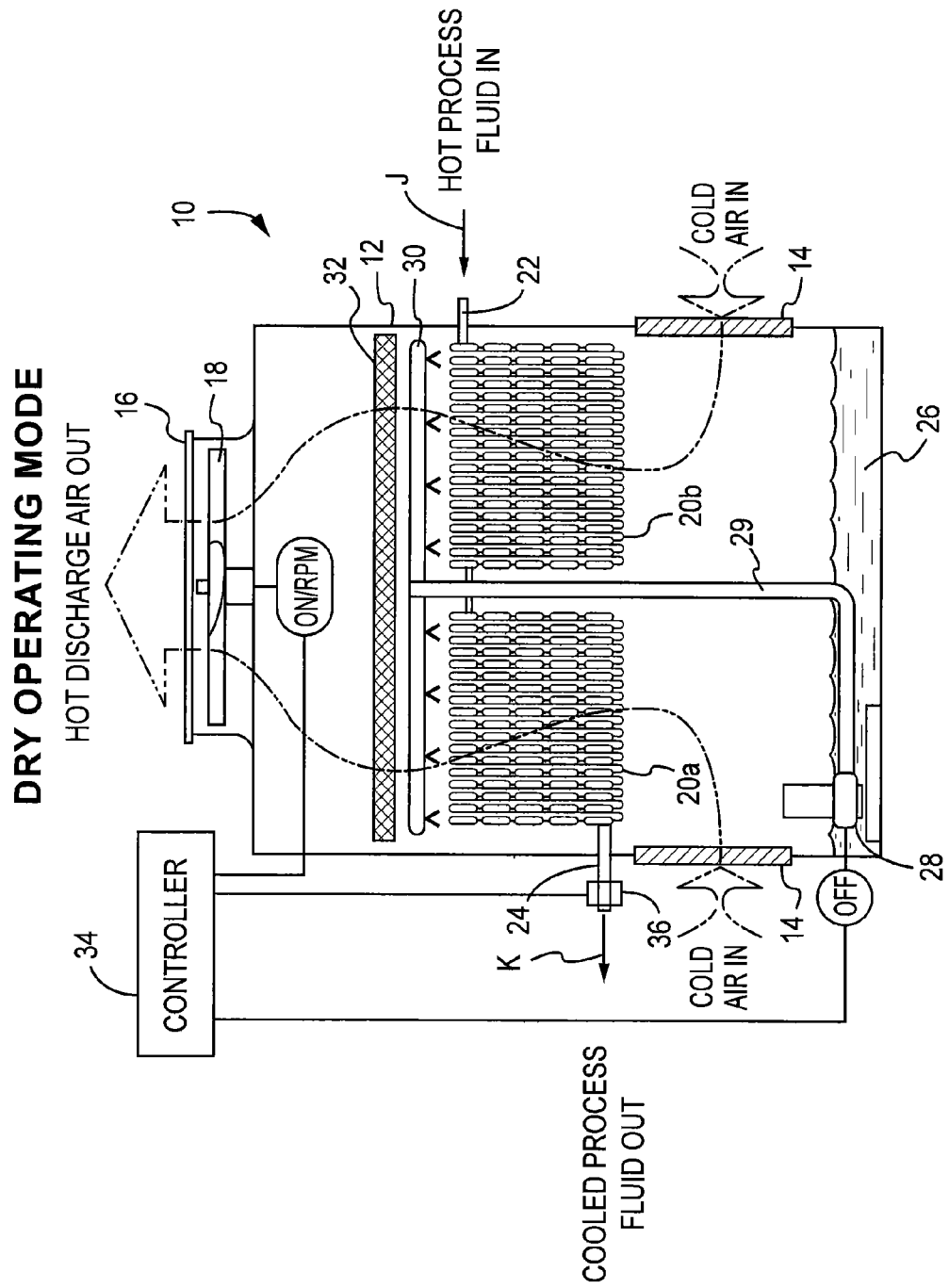
FIG. 2 is a diagrammatical view of the conventional heat exchanger unit in a DRY operating mode incorporating the first exemplary embodiment of the method of the present invention.
Figure 3:
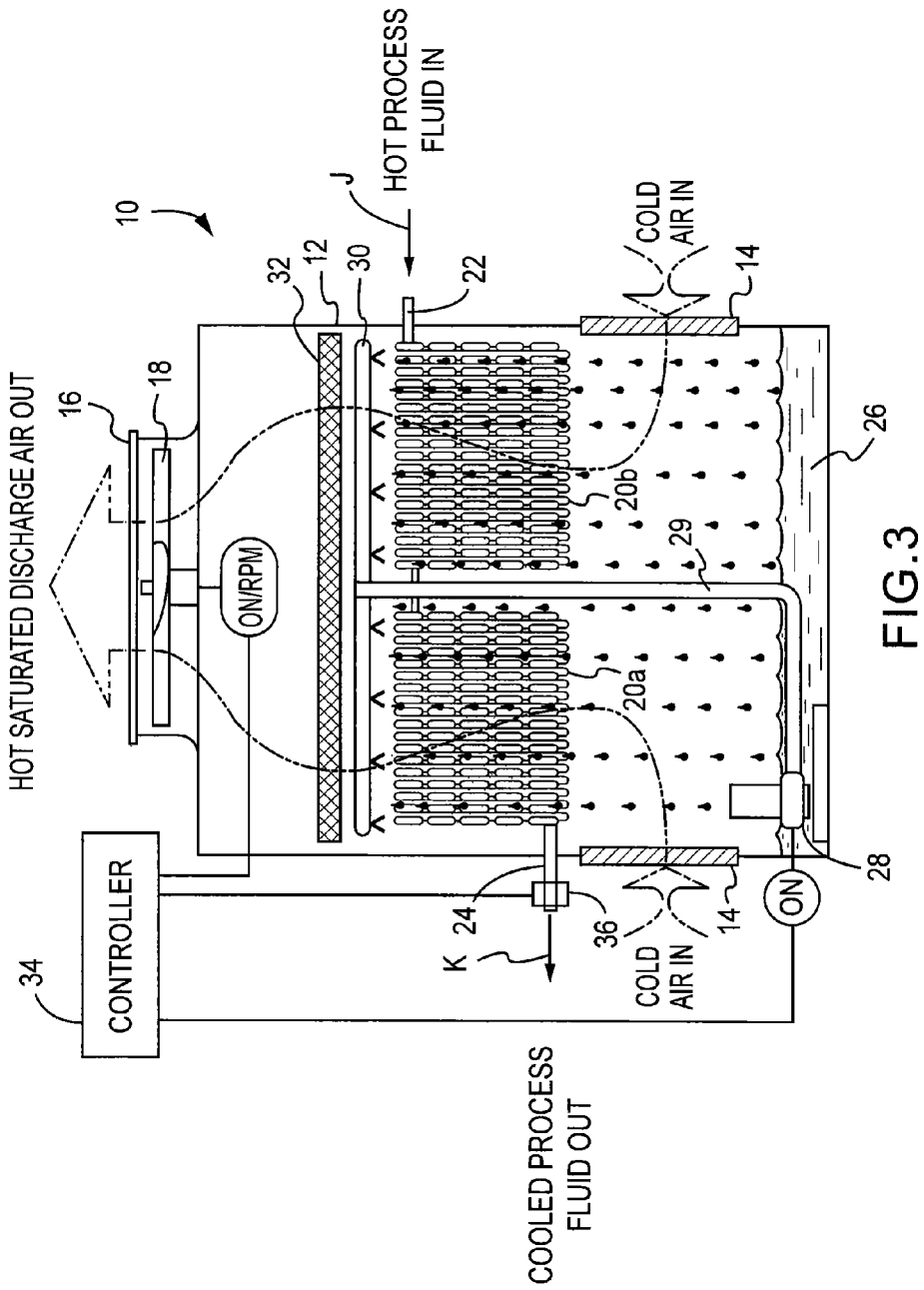
FIG. 3 is a diagrammatical view of the conventional heat exchanger unit in an EVAPORATIVE operating mode incorporating the first exemplary embodiment of the method of the present invention.

A first exemplary embodiment of a method of the present invention is hereinafter described with reference to FIGS. 1-6. The method of the present invention operates a conventional heat exchanger unit 10 as illustrated in FIGS. 1-3. By way of example only for the first exemplary embodiment of the method of the present invention, the illustrated heat exchanger unit 10 is commonly referred to as a "cooler" or "evaporative cooler" and includes a cabinet 12 with louvers 14 for cold air to enter therein and an air outlet 16 for processed air to exhaust therefrom. A fan 18 is disposed by the air outlet 16 and a pair of conventional heat exchanger components 20a and 20b are disposed in the cabinet 12. As is known in the art, the pair of heat exchangers 20a and 20b can be fluidically connected either in series or in parallel so that hot process fluid (represented by arrow J) flows thereinto at a hot fluid inlet 22 and a cooled process fluid (represented by arrow K) exits therefrom at a cooled fluid outlet 24. A reservoir of cooling fluid 26 is provided at a bottom of the cabinet 12. When energized, a pump 28 pumps the cooling fluid 26 up a riser pipe 29 and into a manifold 30 under pressure so that the cooling fluid 26 can be sprayed or otherwise distributed over the heat exchanger components 20a and 20b. Water is typically used as the cooling fluid 26. A drift eliminator 32 is positioned in the cabinet 12 between the manifold 30 and the fan 18.

Figure 4:
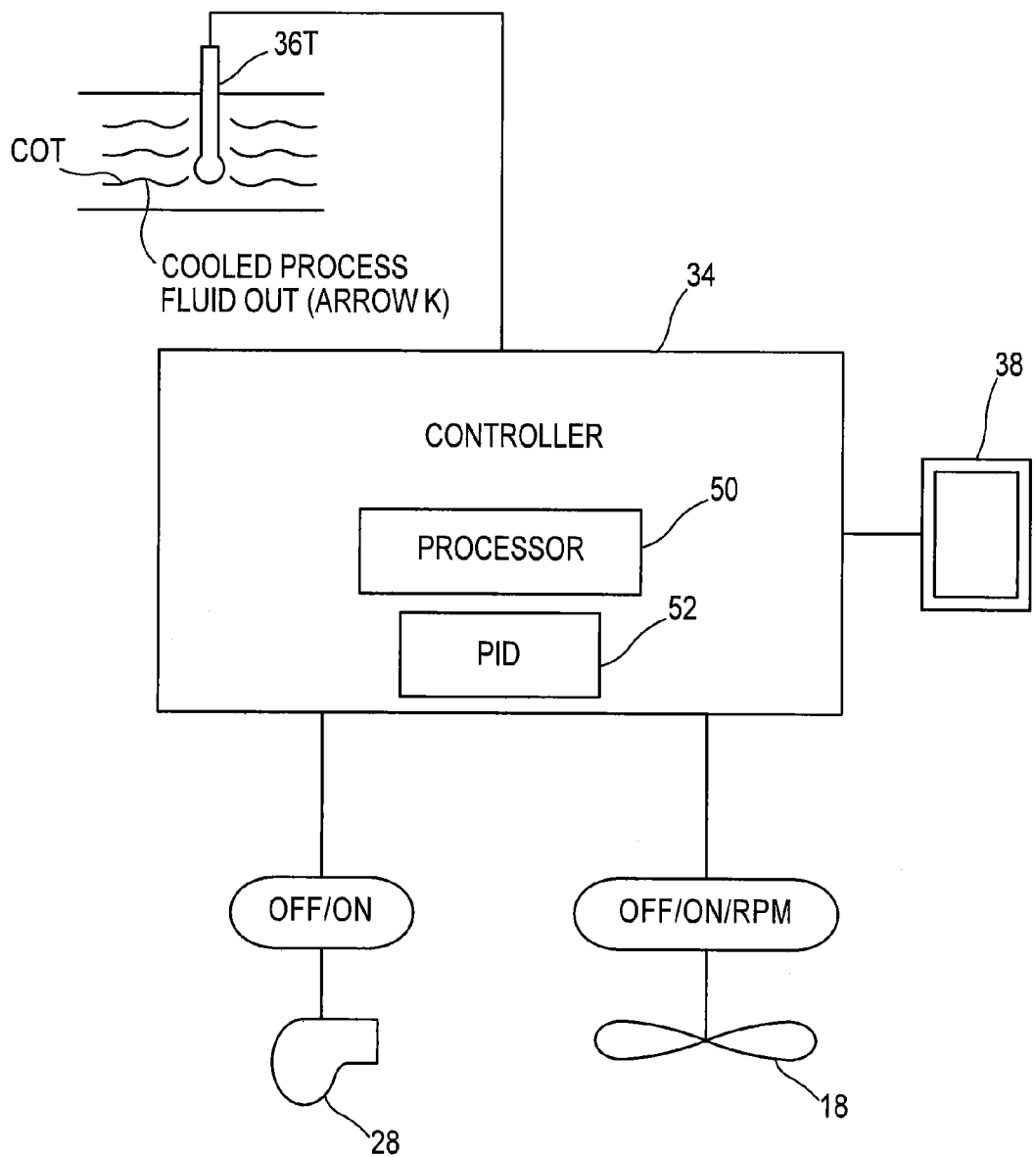
FIG. 4 is a diagrammatical view of a controller interconnected with a temperature sensor, a pump, a fan and an interface that implements the first exemplary embodiment of the method of the present invention.

In FIGS. 1-4, the method of the present invention is embodied in a controller 34. The controller 34 is operably connected to the fan 18, the pump 28 and a sensor 36. For the first exemplary embodiment of the method of the present invention, the sensor 36 is a temperature sensor 36T as best represented in FIG. 4. The steps of the method of the present invention are implemented as illustrated in the flow chart of FIGS. 5A and 5B and as described hereinbelow.

Figure 6:
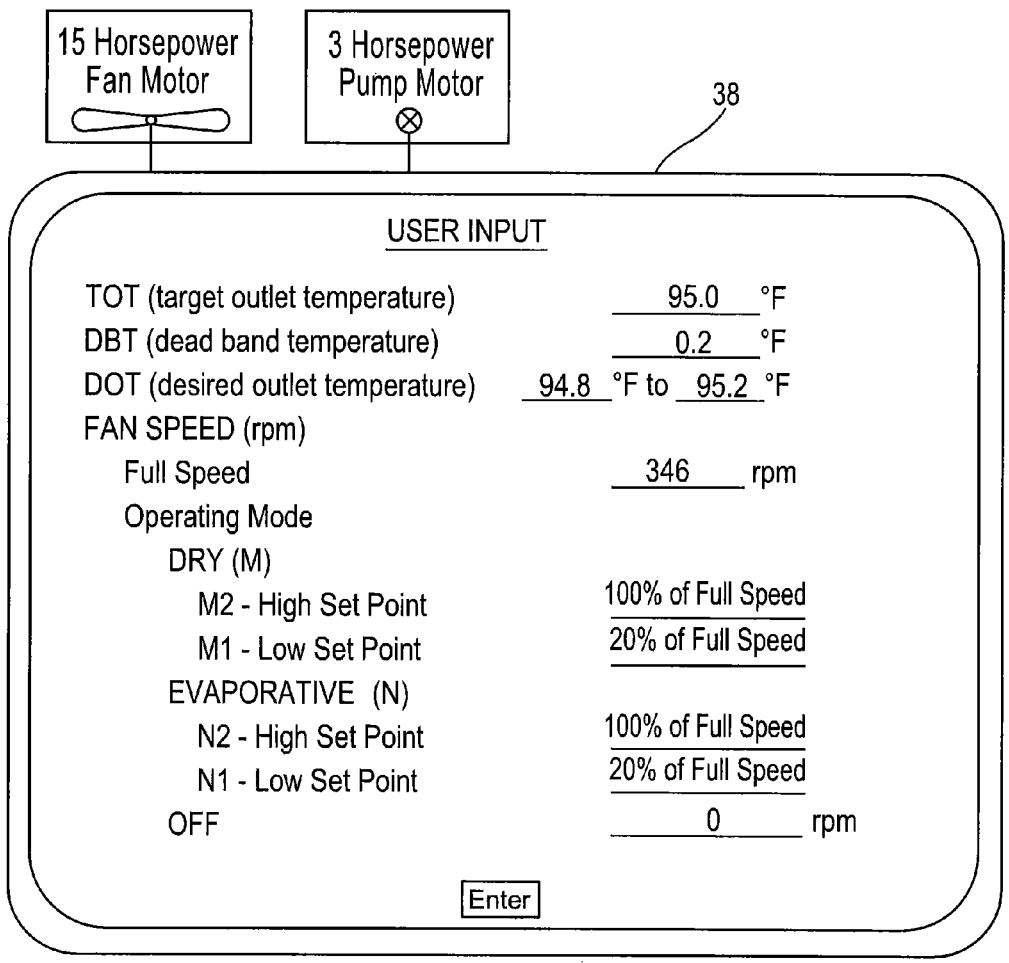
FIG. 6 is a diagrammatical view of an exemplary interface with a list of operating parameters of the heat exchanger unit to implement the first embodiment of the method of the present invention.
Figure 7A:
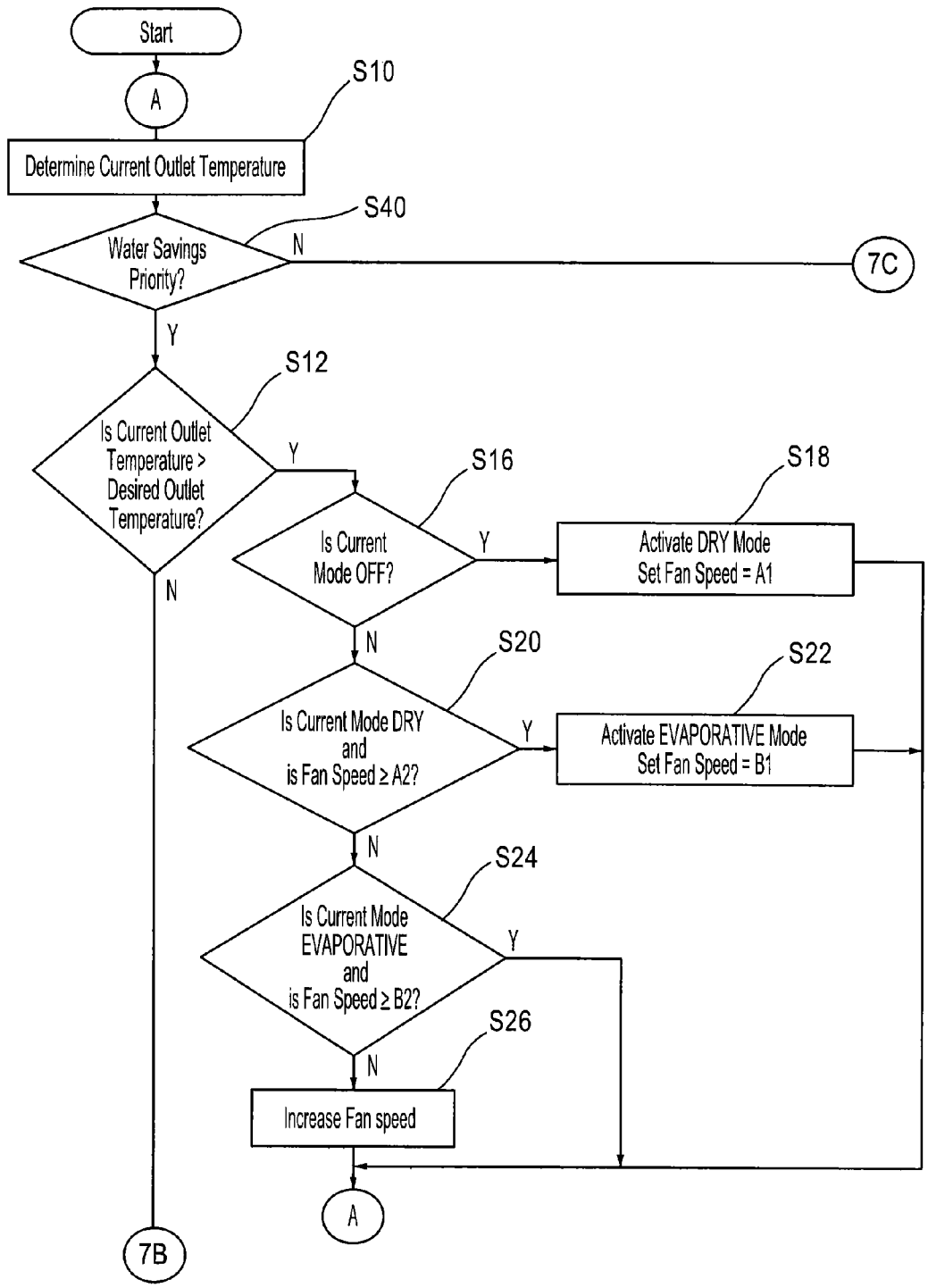
FIGS. 7A-7D are a flow chart of a second exemplary embodiment of the method of the present invention.
Figure 7B:
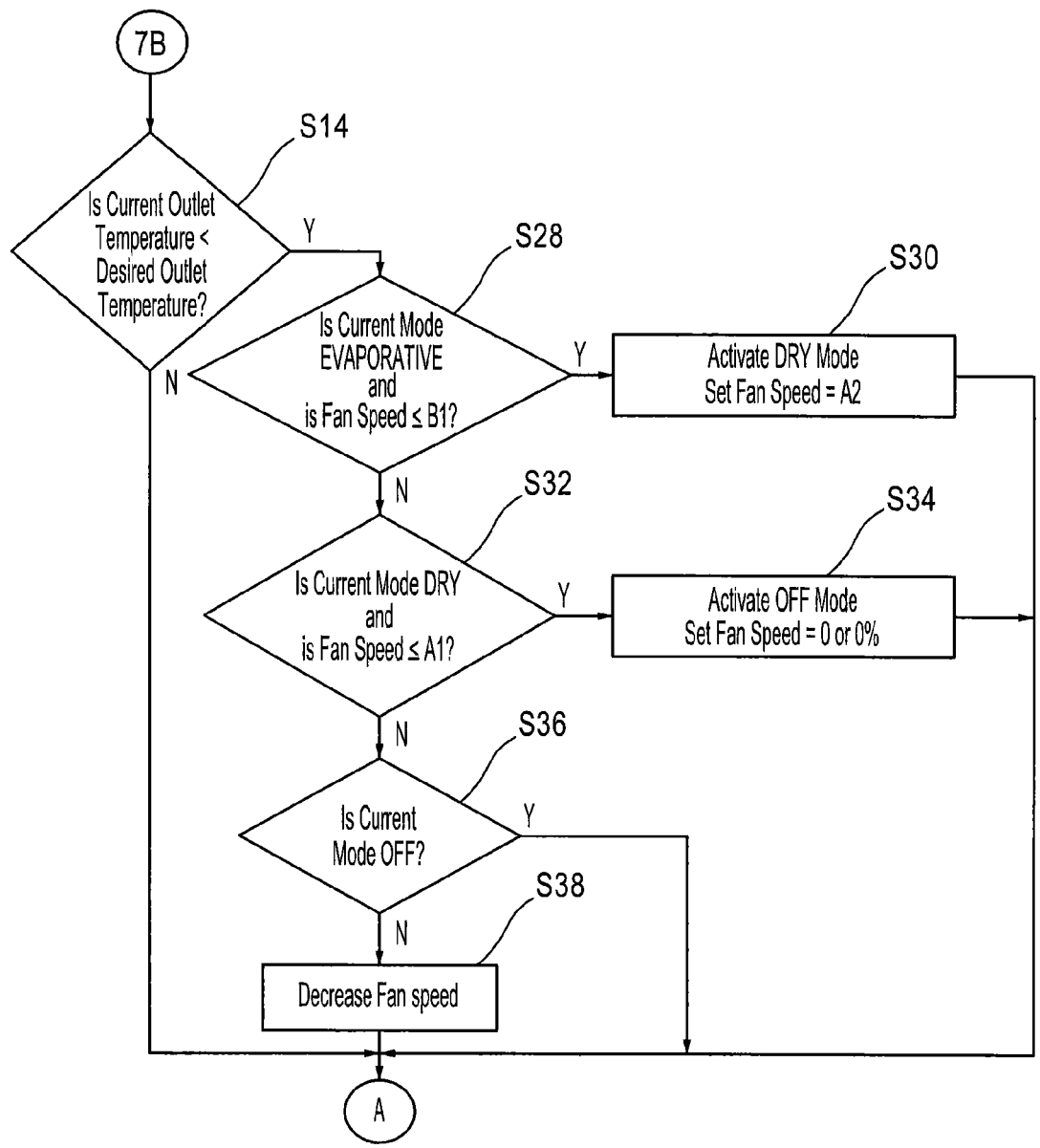
Figure 7C:
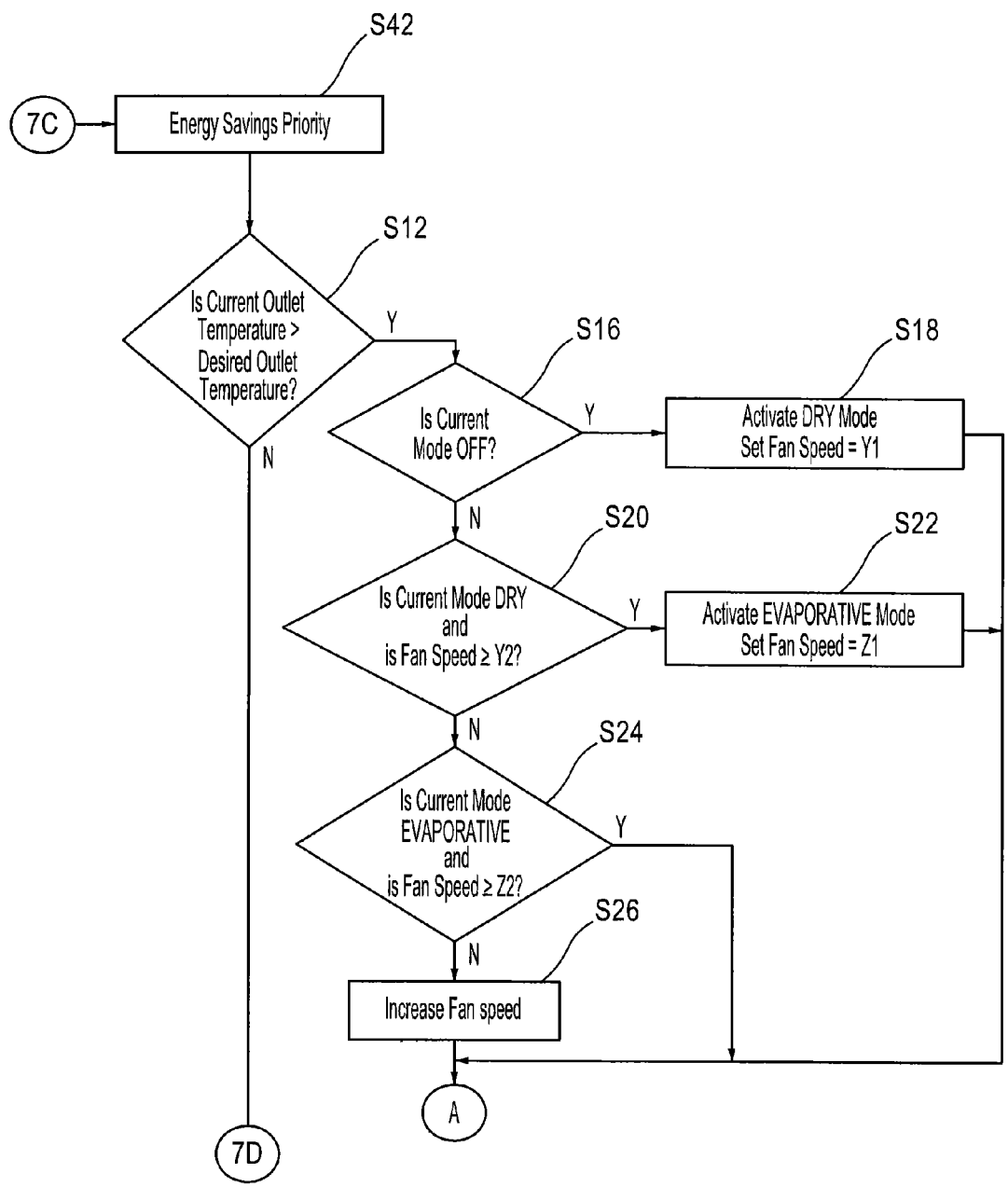
Figure 7D:
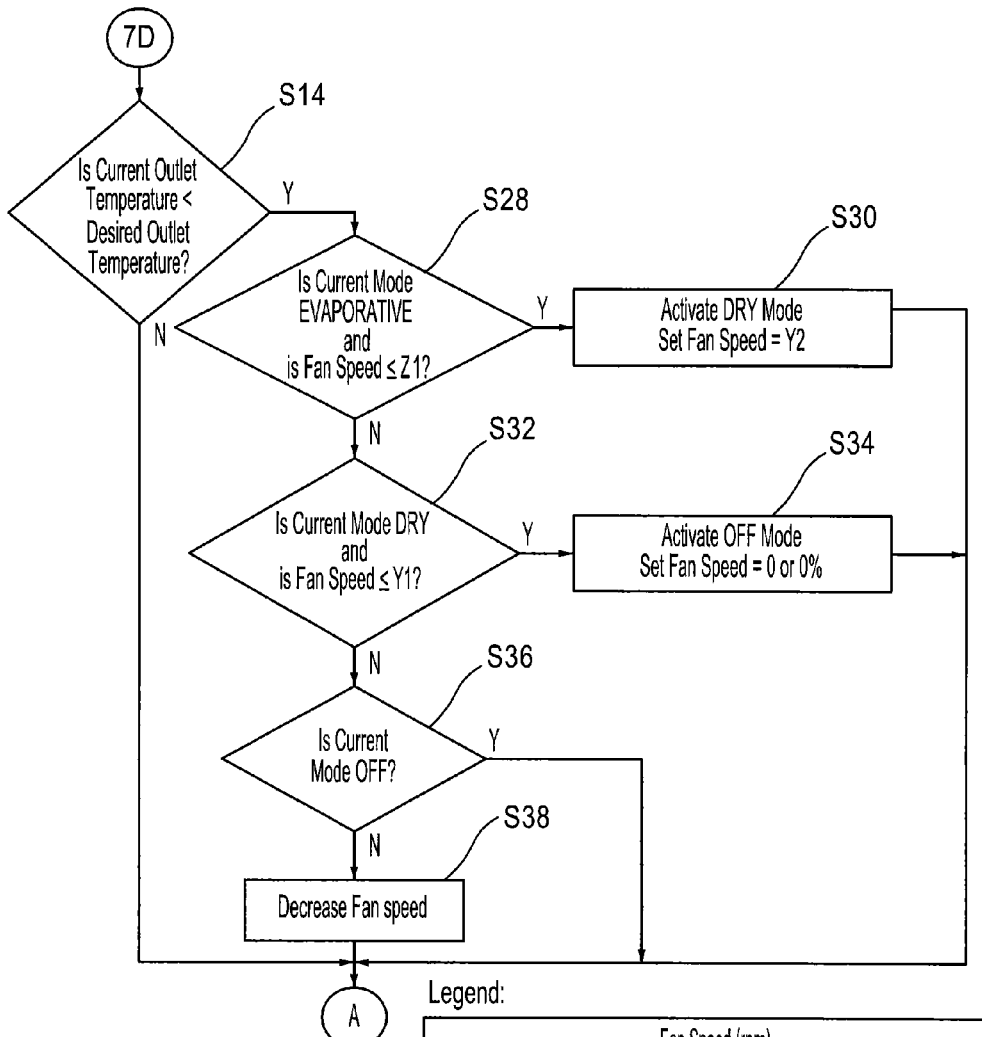

The method operates the heat exchanger unit 10 with the process fluid flowing therethrough (represented by arrows J and K). The fan 18 is capable of variably rotating in a range of fan speeds (rpm) and the heat exchanger unit 10 is operable in an OFF operating mode shown in FIG. 1, a DRY operating mode shown in FIG. 2 and an EVAPORATIVE operating mode shown in FIG. 3. By way of example only and not by way of limitation, the range of fan speeds (rpm) is expressed as a percentage of full speed of the fan 18 as illustrated in FIG. 6 and, for the first embodiment of the present invention, in a range of 20% to 100% of full speed. In the OFF operating mode in FIG. 1, both the pump 28 and the fan 18 are in an OFF state. That is, the pump 28 is not pumping cooling fluid 26 and there is no rotation of the fan 18, i.e., the fan speed is 0 rpm. In the DRY operating mode, the fan 18 is in an ON state and the pump is in the OFF state. That is, the fan 18 is rotating at a fan speed and the pump 28 is not pumping cooling fluid 26. In the EVAPORATIVE operating mode, the fan 18 and the pump 28 are in their respective ON states. That is, the fan 18 is rotating at a fan speed and the pump 28 is pumping cooling fluid 26. The operating modes of the heat exchanger unit 10 are summarized in Table 1 as follows:

TABLE 1

| Operating Mode | Fan 18 | Pump 28 |
|---|---|---|
| DRY | ON | OFF |
| EVAPORATIVE | ON | ON |
| OFF | OFF | OFF |

Before executing the method of the present invention, a user thereof establishes predetermined operating parameters of the heat exchanger unit 10. Although the description of the exemplary embodiments hereinafter proceeds with reference to the user, one of ordinary skill in the art would appreciate that a factory operator might establish the predetermined operating parameters instead of the user or that the factory operator establishes some of the predetermined operating parameters at the factory while the user establishes the remaining ones of the predetermined operating parameters at the work site. As shown in FIG. 6, a number of predetermined operating parameters are determined by the user (or the factory operator or both) before execution of the method of the present invention so that the method of the present invention operates the heat exchanger unit 10 with a desired outlet temperature DOT desired by the user. The desired outlet temperature DOT of the cooled process fluid is the temperature at which the cooled process fluid is desired to exit the heat exchanger unit 10. By way of example only and not by way of limitation, the user inputs into the controller 34 the operating parameters of a target outlet temperature TOT of the cooled process fluid out (represented by arrow K) desired by the user in degrees Fahrenheit, a dead band temperature DBT in degrees Fahrenheit which is considered an accuracy tolerance associated with the target outlet temperature TOT, a DRY operational mode high set point fan speed M2 in rpm, a DRY operational mode low set point fan speed M1 being a percentage of and smaller than the DRY operational mode high set point fan speed M2, an EVAPORATIVE operational mode high set point fan speed N2 in rpm, an EVAPORATIVE operational mode low set point fan speed N1 being a percentage of and smaller than the EVAPORATIVE operating mode high set point fan speed N2. One of ordinary skill in the art would appreciate that the high and low set point fan speeds vary depending upon the desired outlet temperature DOT determined by the user and depending upon the power requirements of the fan 18 and pump 28.

By way of example only and not by way of limitation, an interface 38, such as a touch screen interface, is used to input the predetermined operating parameters into the controller 34 as illustrated in FIG. 6. Furthermore, by way of example only, the interface 38 can be incorporated into the controller 34 itself or can be remotely connected thereto as is known in the art.

A skilled artisan would comprehend that the target outlet temperature TOT of the cooled process fluid out (represented by arrow K) desired by the user plus or minus the dead band temperature DBT is equal to the desired outlet temperature DOT that would acceptable to the user for effectively operating the heat exchanger unit 10. For example, if the predetermined target outlet temperature TOT for the cooled process fluid out (represented by arrow K) is 85° F. and the predetermined dead band temperature DBT is 0.5° F., then the desired outlet temperature DOT for the cooled process fluid out is equal to the target outlet temperature TOT plus or minus the dead band temperature DBT or, in this case, any temperature in the range of 84.5° F. and 85.5° F. inclusively.

Throughout the description of the method of the present invention, the term "current" is used. As is known by one of ordinary skill in the art, "current" is the real time condition or substantially the real time condition of the heat exchanger unit 10 as it is presently operating. For example, a current outlet temperature COT shown in FIG. 4 is the present outlet temperature of cooled process fluid flowing out of the operating heat exchanger unit 10 and a current operating mode of the operating heat exchanger unit 10 is the present operating mode, i.e. OFF, DRY or EVAPORATIVE, in which the heat exchanger unit 10 is presently operating.

Figure 5A:
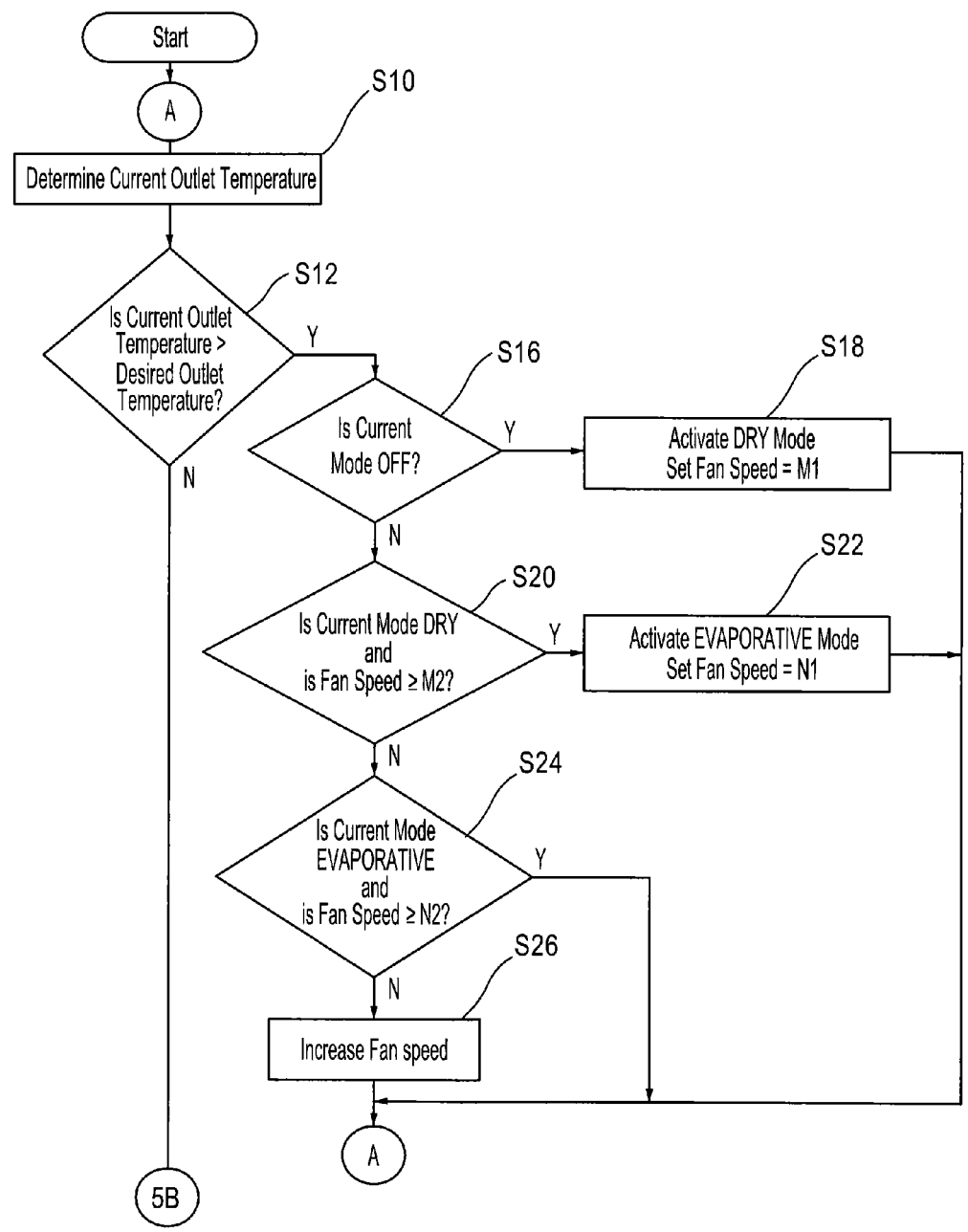
FIGS. 5A and 5B are a flow chart of the first exemplary embodiment of the method of the present invention.
Figure 5B:
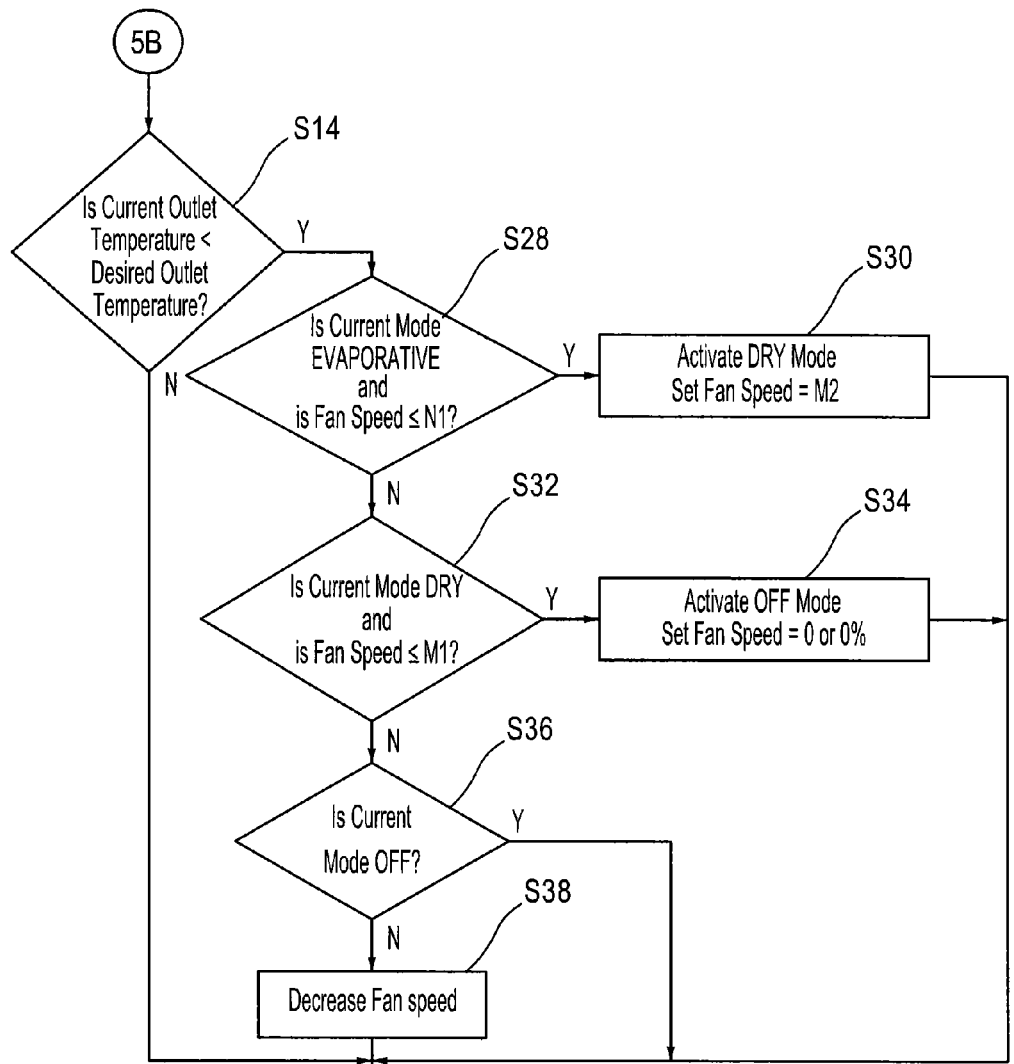

With reference to FIGS. 5A and 5B, the controller 34 is started. After the controller 34 is started, Step 10 is executed. Step S10 determines the current outlet temperature COT (see FIG. 4) of the cooled process fluid flowing out (represented by arrow K in FIGS. 1-3) of the heat exchanger unit 10 at or adjacent the cooled fluid outlet 24. As shown in FIG. 4, the controller 34 is connected to a conventional temperature sensor 36T that is disposed in the cooled process fluid flowing out of the heat exchanger unit 10. Although not by way of limitation but by example only, the conventional temperature sensor 36T sends an electrical signal to the controller 34 that is representative of the current outlet temperature COT.

After Step S10, Step S12 is executed. Step S12 determines if the current outlet temperature COT of the cooled process fluid is greater than the desired outlet temperature DOT of the cooled process fluid and Step S14 determines if the current outlet temperature COT of the cooled process fluid is less than the desired outlet temperature DOT of the cooled process fluid. If the current outlet temperature COT of the cooled process fluid is greater than the desired outlet temperature DOT of the cooled process fluid, then either the current fan speed is incrementally increased or the current fan speed is set at a predetermined low set point fan speed as discussed in more detail below. Alternatively, if the current outlet temperature COT of the cooled process fluid is less than the desired outlet temperature DOT of the cooled process fluid, then either the current fan speed is incrementally decreased or the current fan speed is set at a predetermined high set point fan speed or the OFF operating mode is activated as discussed in more detail below. As reflected in FIG. 6, the predetermined high set point fan speed in either the DRY or the EVAPORATIVE operating mode is larger than the predetermined low set point fan speed.

If it is determined in Step S12 that the current outlet temperature COT is greater than the desired outlet temperature DOT, Step S16 is executed. Step S16 determines whether the current operating mode is the OFF operating mode. If the current operating mode is the OFF operating mode, then Step S18 is executed. For Step S18, the DRY operating mode is activated and the fan speed is set at the predetermined dry-mode low set point fan speed M1 in FIG. 6

If it is determined in Step S12 that the current outlet temperature COT is greater than the desired outlet temperature DOT and after it is determined in Step S16 that the current mode is not OFF, Step S20 is executed. Step S20 determines whether the current operating mode is the DRY operating mode and whether the fan speed is greater than or equal to a predetermined dry-mode high set point fan speed M2 in FIG. 6. If the current operating mode is the DRY operating mode and if the fan speed is greater than or equal to the predetermined dry-mode high set point fan speed M2, then Step S22 is executed. For Step S22, the EVAPORATIVE mode is activated and the fan speed is set to a predetermined evaporative-mode low set point fan speed N1.

If it is determined in Step S12 that the current outlet temperature COT is greater than the desired outlet temperature DOT and after it is determined in Step S20 that the current mode is not DRY and the fan speed is not greater than or equal to the predetermined dry-mode high set point fan speed M2, Step S24 is executed. Step S24 determines whether the current operating mode is the EVAPORATIVE operating mode and whether the current fan speed is greater than or equal to a predetermined evaporative-mode high set point fan speed N2. If the current operating mode is the EVAPORATIVE operating mode and the current fan speed is greater than or equal to the predetermined evaporative-mode high set point fan speed N2, then the heat exchanger unit 10 continues to operate in the EVAPORATIVE operating mode with the current fan speed being greater than or equal to the predetermined evaporative-mode high set point fan speed N2.

To summarize, each one of Step S12, Step S16, Step S20 and Step S24 described above has been determined to be a "yes" determination and the user-determined fan speeds are summarized in Table 2 as follows:

TABLE 2

| Operating Mode | Fan Speed (rpm) | |
| --- | --- | --- |
| | low set point | high set point |
| DRY | M1 | M2 |
| EVAPORATIVE | N1 | N2 |
| OFF | 0 | 0 | and M1 < M2 and N1 < N2.

If each one of Step S16, Step S20 and Step S24 is determined to be a "no" determination and Step 12 is determined to be a "yes" determination, then Step S26 is executed. In Step S26, the current fan speed is incrementally increased. More specifically, if the current outlet temperature COT is greater than the desired outlet temperature DOT (Step 12) and the heat exchanger unit 10 is not currently operating under any one of the following listed operating conditions, namely:

1. the current operating mode is the OFF operating mode (Step S16);
2. the current operating mode is the DRY operating mode and the current fan speed is greater than or equal to a predetermined dry-mode high set point fan speed (Step S20); or
3. the current operating mode is the EVAPORATIVE operating mode and the current fan speed is greater than or equal to a predetermined evaporative-mode high set point fan speed (Step S24), then the Step S26 of incrementally increasing the fan speed is executed. Thereafter, the method returns to Step S10.

Now, if it is determined in Step S12 that the current outlet temperature COT is not greater than the desired outlet temperature, Step S14 is then executed. Step S14 determines whether the current outlet temperature COT is less than the desired outlet temperature DOT.

If the current outlet temperature COT is less than the desired outlet temperature DOT, then Step S28 is executed. Step S28 determines whether the current operating mode is the EVAPORATIVE operating mode and whether the current fan speed is less than or equal to the predetermined evaporative-mode low set point fan speed N1. If the current operating mode is the EVAPORATIVE operating mode and the current fan speed is less than or equal to the predetermined evaporative-mode low set point fan speed, then Step S30 is executed. In Step S30, the DRY operating mode is activated and the current fan speed is set at the predetermined dry-mode high set point fan speed M2.

If the current outlet temperature COT is less than the desired outlet temperature DOT and the current mode is not EVAPORATIVE and the fan speed is not less than the predetermined evaporative-mode low set point fan speed N1, then Step S32 is executed. Step S32 determines whether the current operating mode is the DRY operating mode and whether the current fan speed is less than or equal to the predetermined dry-mode low set point fan speed. If the current operating mode is the DRY operating mode and the current fan speed is less than or equal to the predetermined dry-mode low set point fan speed, then Step S34 is executed. In Step S34, the OFF operating mode is activated.

If the current outlet temperature COT is less than the desired outlet temperature DOT and the current mode is not DRY and the fan speed is not less than or equal to the predetermined dry-mode low set point fan speed M1, then Step S36 is executed. Step S36 determines whether the current operating mode is the OFF operating mode. If the current operating mode is the OFF operating mode, then the heat exchanger unit continues to operate in the OFF operating mode.

To summarize, each one of Step S14, Step S28, Step S32 and Step S36 described above has been determined to be a "yes" determination. If each one of Step S28, Step S32 and Step S36 is determined to be a "no" determination and Step 14 is determined to be a "yes" determination, then Step S38 is executed. In Step S38, the current fan speed is incrementally decreased. More specifically, if the current outlet temperature COT is less than the desired outlet temperature DOT (Step S14) and the heat exchanger unit 10 is not currently operating under any one of the following listed operating conditions, namely:

1. the current operating mode is the OFF operating mode (Step S36);
2. the current operating mode is the DRY operating mode and the current fan speed is less than or equal to the predetermined dry-mode low set point fan speed M1 (Step S32); or
3. the current operating mode is the EVAPORATIVE operating mode and the current fan speed is less than or equal to a predetermined evaporative-mode low set point fan speed N1 (Step S28), then the Step S38 of incrementally decreasing the fan speed is executed. Thereafter, the method returns to Step S10.

If the current outlet temperature COT of the process fluid is equal to the desired outlet temperature DOT of the process fluid, the heat exchanger unit 10 operates in its current operating mode. In other words, Step S12 and Step S14 are determined to be "no" determinations and the method again returns to Step S10.

A second exemplary embodiment of the method of the present invention is hereinafter described with reference to FIGS. 7A-D and 8. For the second exemplary embodiment of the present invention, the heat exchanger unit 10, while operating in the DRY operating mode or the EVAPORATIVE operating mode, operates either in a water savings priority condition or an energy savings priority condition. In the water savings priority condition, the heat exchanger unit 10 is optimized to save water in favor over energy savings and, in the energy savings priority condition, the heat exchanger is optimized to save energy in favor over water savings. In this case energy savings refers to the electrical energy consumed by the heat exchanger unit rather than energy consumption of the entire cooling system.

With reference to FIGS. 7A-7D, after Step S10, Step S40 is executed. Step S40 determines whether the water savings priority condition is to be implemented. If the water savings priority condition is to be implemented, then Steps S12 through S38 are to be executed as described hereinabove but with fan speeds particularly suitable for water savings as discussed in more detail below. If Step S40 determines that the water savings priority condition is not to be implemented, then Step S42 is executed. In Step S42, the energy saving priority condition is to be implemented. If the energy savings priority condition is to be implemented, then Steps S12 through S38 are to be executed as described hereinabove but with fan speeds particularly suitable for energy savings as discussed in more detail below. However, a skilled artisan would appreciate that Step S40 might determine whether the energy savings priority condition is to be implemented and, correspondingly, Step S42 would implement the water savings priority condition without departing from the spirit of the invention.

As shown in FIGS. 7 and 8, in the water savings priority condition, the predetermined low set point fan speed determined by the user is a water-savings dry-mode low set point fan speed A1 or a water-savings evaporative-mode low set point fan speed B1 and the predetermined high set point fan speed determined by the user is a water-savings dry-mode high set point fan speed A2 or a water-savings evaporative-mode high set point fan speed B2. In the energy savings priority condition, the predetermined low set point fan speed determined by the user is an energy-savings dry-mode low set point fan speed Y1 or an energy-savings evaporative-mode low set point fan speed Z1 and the predetermined high set point fan speed determined by the user is an energy-savings dry-mode high set point fan speed Y2 or an energy-savings evaporative-mode high set point fan speed Z2.

The user-determined fan speeds for the second exemplary embodiment of the method of the present invention are summarized in Table 3 as follows:

TABLE 3

| | Fan Speed (rpm) | | | |
|---|---|---|---|---|
| | Water Savings Priority | | Energy Savings Priority | |
| Operating Mode | low set point | high set point | low set point | high set point |
| DRY | A1 | A2 | Y1 | Y2 |
| EVAPORATIVE | B1 | B2 | Z1 | Z2 |
| OFF | 0 | 0 | 0 | 0 | and A1 < A2, B1 < B2, Y1 < Y2 and Z1 < Z2.

Figure 10:
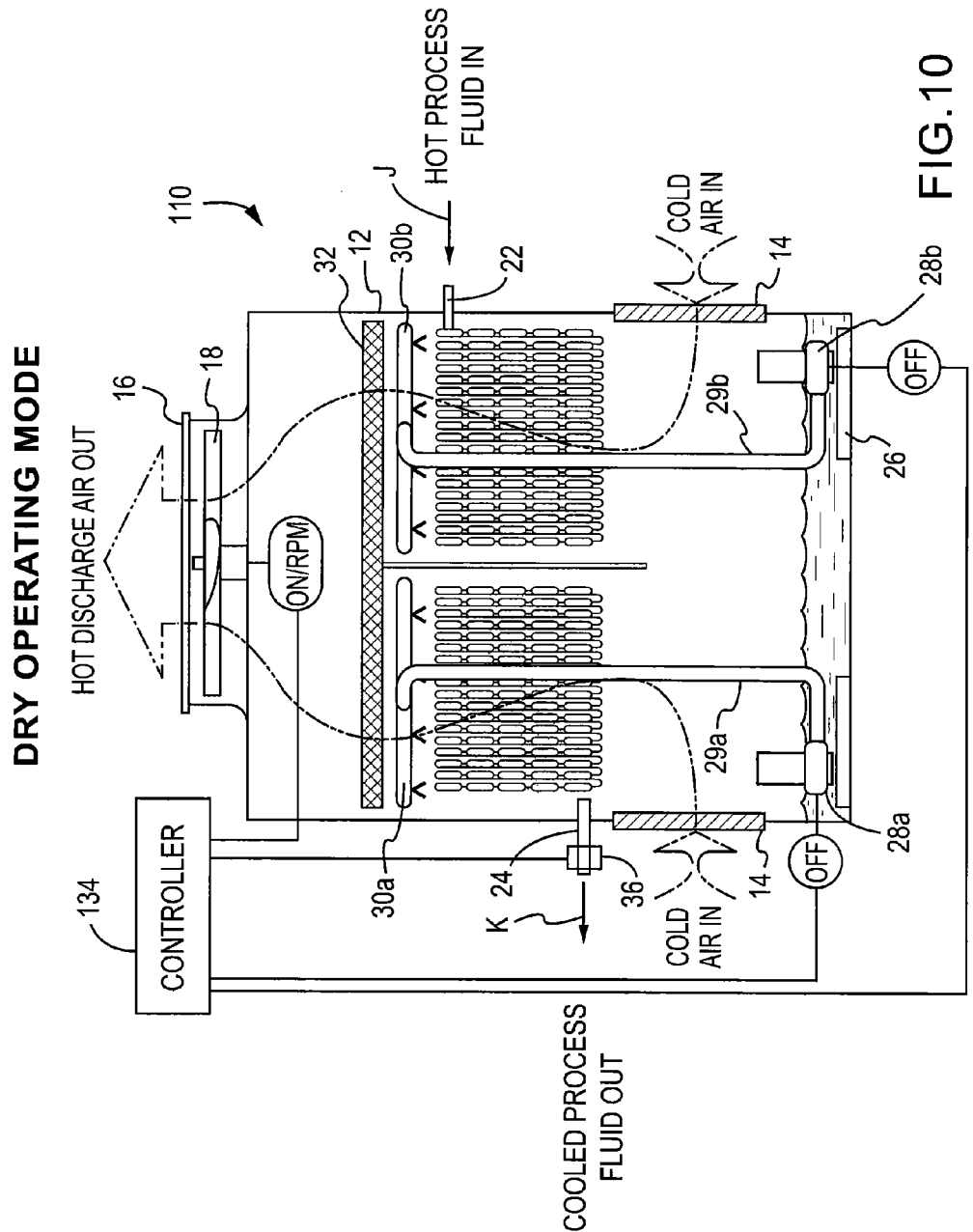
FIG. 10 is a diagrammatical view of the different heat exchanger unit in a DRY operating mode incorporating the third exemplary embodiment of the method of the present invention.
Figure 11:
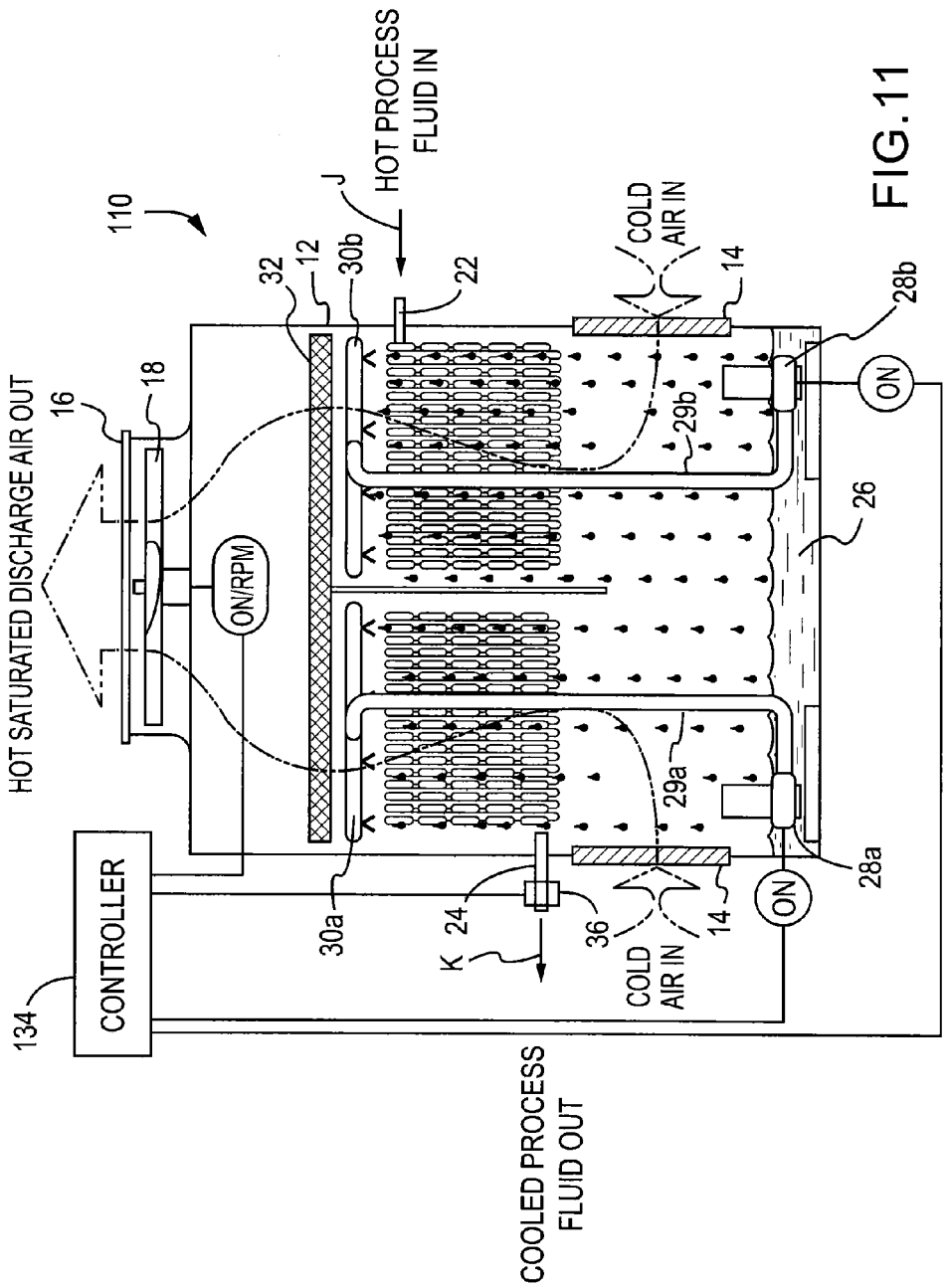
FIG. 11 is a diagrammatical view of the different heat exchanger unit in an EVAPORATIVE operating mode incorporating the third exemplary embodiment of the method of the present invention.
Figure 12:
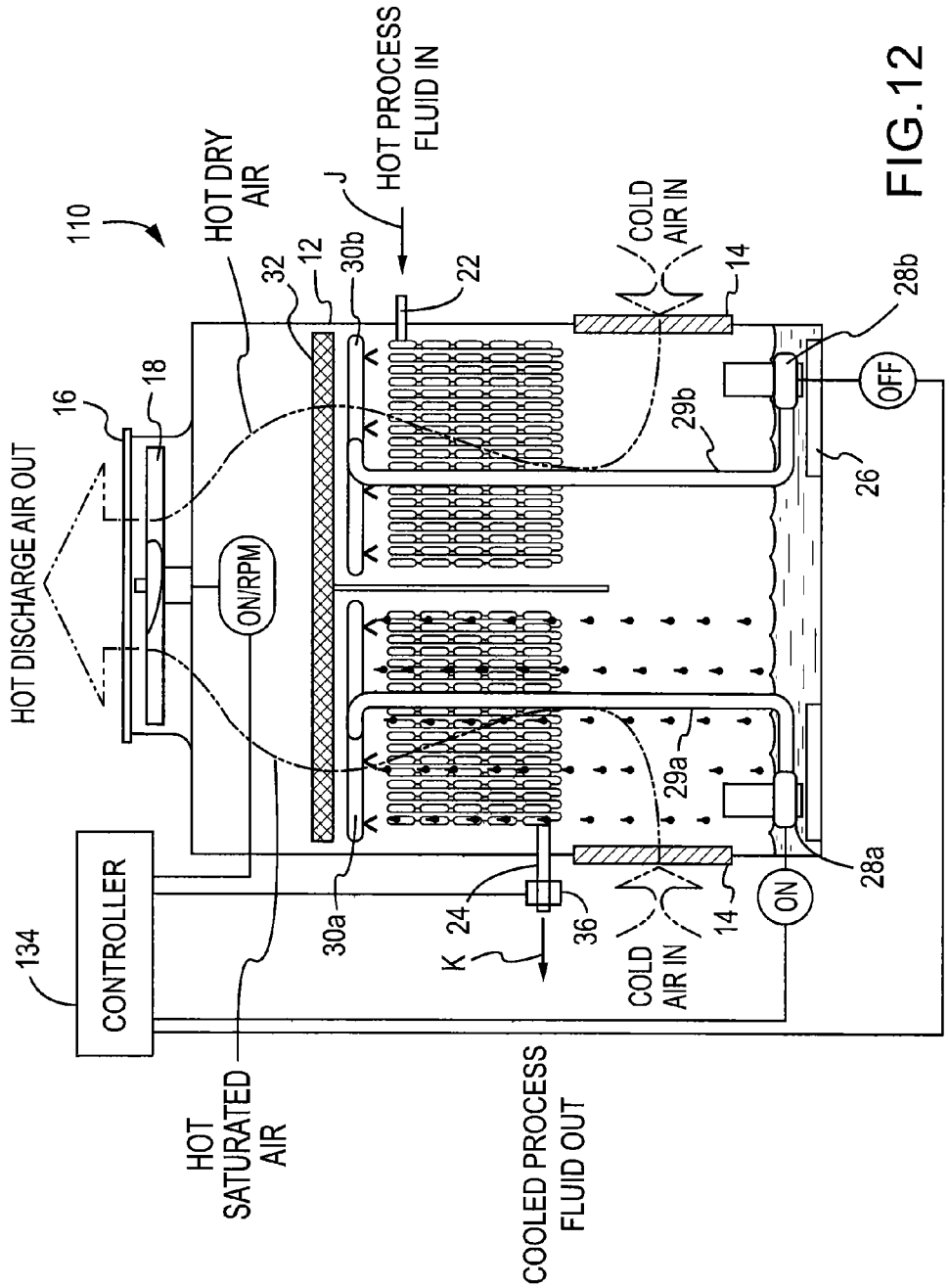
FIG. 12 is a diagrammatical view of the different heat exchanger unit in a WATER EFFICIENT operating mode incorporating the third exemplary embodiment of the method of the present invention.

A third exemplary embodiment of the method of the present invention is introduced in FIG. 9. The third exemplary embodiment of the method of the present invention operates a heat exchanger unit 110 with a process fluid flowing therethrough. The heat exchanger unit 110 is described in more detail in U.S. patent application Ser. No. 12/885,083 entitled hybrid heat exchanger apparatus and filed on Sep. 17, 2010. The heat exchanger unit 110 has a first pump 28a, a second pump 28b and the fan 18 rotatable in a range of fan speeds. The heat exchanger unit 110 is operable in OFF operating mode, a DRY operating mode, an EVAPORATIVE mode and a WATER EFFICIENT mode. In the OFF operating mode in FIG. 9, the first pump 28a, the second pump 28b and the fan 18 are in an OFF state. In the DRY operating mode in FIG. 10, the fan 18 is in an ON state and the first pump 28a and the second pump 28b are in the OFF state. In the EVAPORATIVE operating mode in FIG. 11, the fan 18, the first pump 28a and the second pump 28b are in the ON state. In the WATER EFFICIENT operating mode in FIG. 12, the fan 18 and the first pump 28a are in the ON state and the second pump 28b is in the OFF state.

The operating modes of the heat exchanger unit 110 are summarized in Table 4 as follows:

TABLE 4

| Operating Mode | Fan 18 | Pump 28a | Pump 28b |
|---|---|---|---|
| DRY | ON | OFF | OFF |
| WATER EFFICIENT | ON | ON | OFF |
| EVAPORATIVE | ON | ON | ON |
| OFF | OFF | OFF | OFF |

Figure 13:
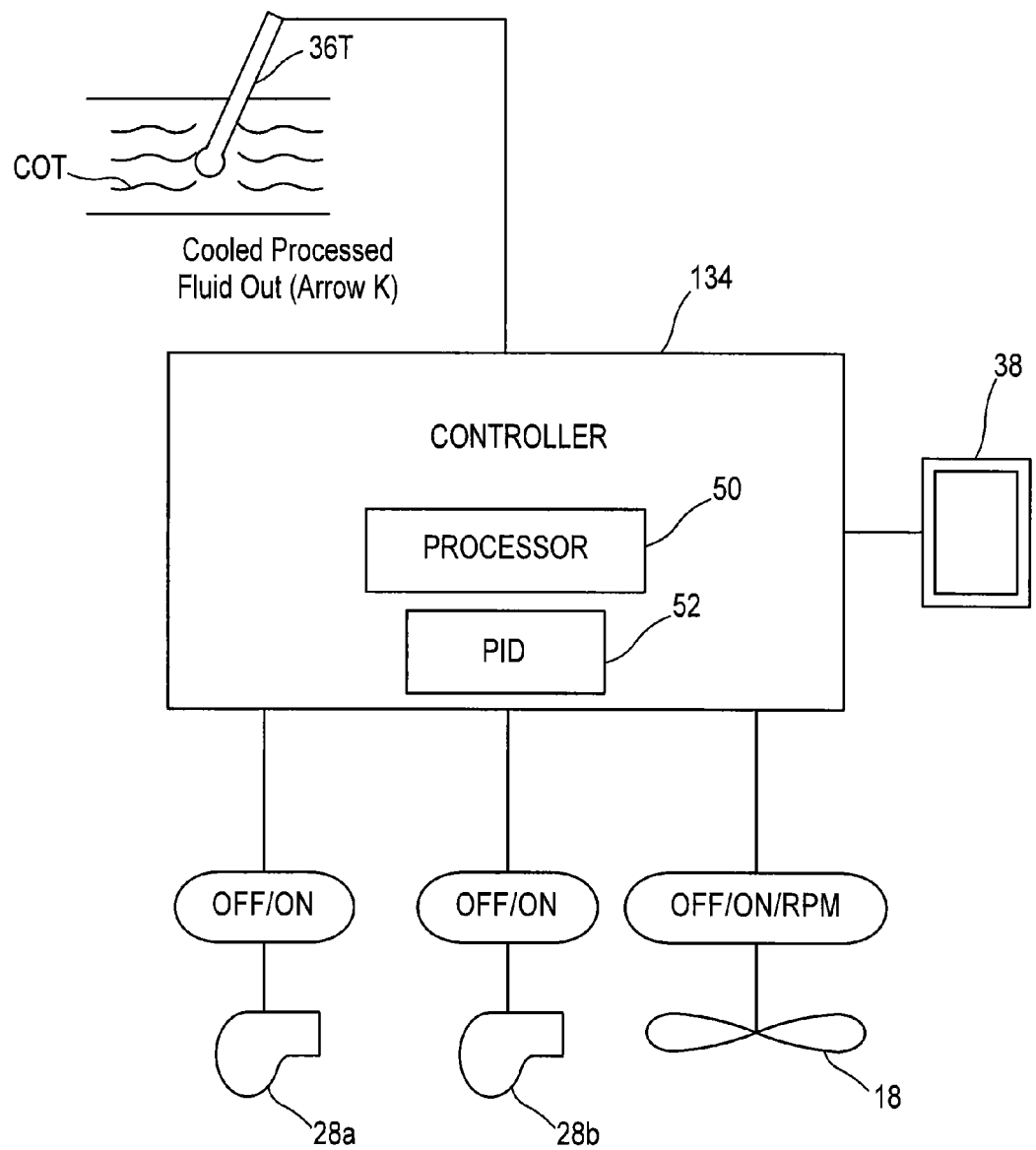
FIG. 13 is a diagrammatical view of the controller interconnected to the temperature sensor, a first pump, a second pump, the fan and the interface that implements the third exemplary embodiment of the method of the present invention.

In FIGS. 9-13, the third exemplary embodiment of the method of the present invention is embodied in a controller 134 and operates similarly as the first exemplary embodiment of the method of the present invention described above. As best shown in FIG. 13, the controller 134 is operably connected to the fan 18, the first pump 28a, the second pump 28b and a sensor 36. For the third exemplary embodiment of the method of the present invention, the sensor 36 is the temperature sensor 36T. The steps of the third exemplary embodiment of the method of the present invention are implemented as illustrated in the flow chart of FIGS. 14A and 14B and as described hereinbelow.

Before executing the third exemplary embodiment of the method of the present invention, the user thereof determines the predetermined operating parameters of the heat exchanger unit 110 shown in FIG. 15. As shown in FIG. 15, the target operating temperature TOT, the dead band temperature DBT, the desired outlet temperature DOT (DOT is derived from TOT+ or −DBT) and the are determined by the user as described hereinabove. One of ordinary skill in the art would appreciate that the incremental increase or decrease in fan speed is calculated by a PID routine. The user also determines the high and low set point fan speeds for each one of the DRY operating mode, the WATER EFFICIENT mode and the EVAPORATIVE mode discussed below.

Figure 14A:
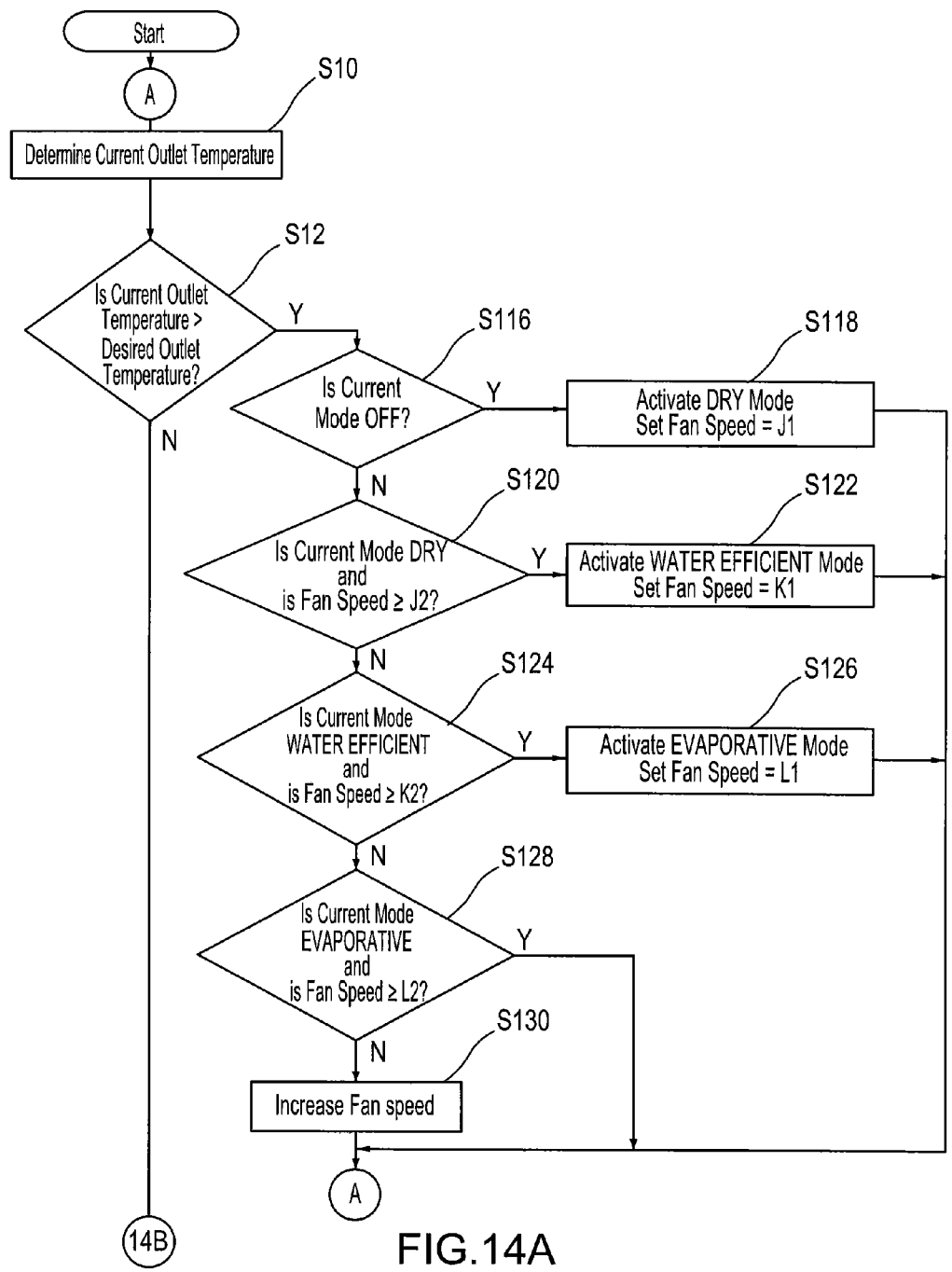
FIGS. 14A and 14B are a flow chart of the third exemplary embodiment of the method of the present invention.
Figure 14B:
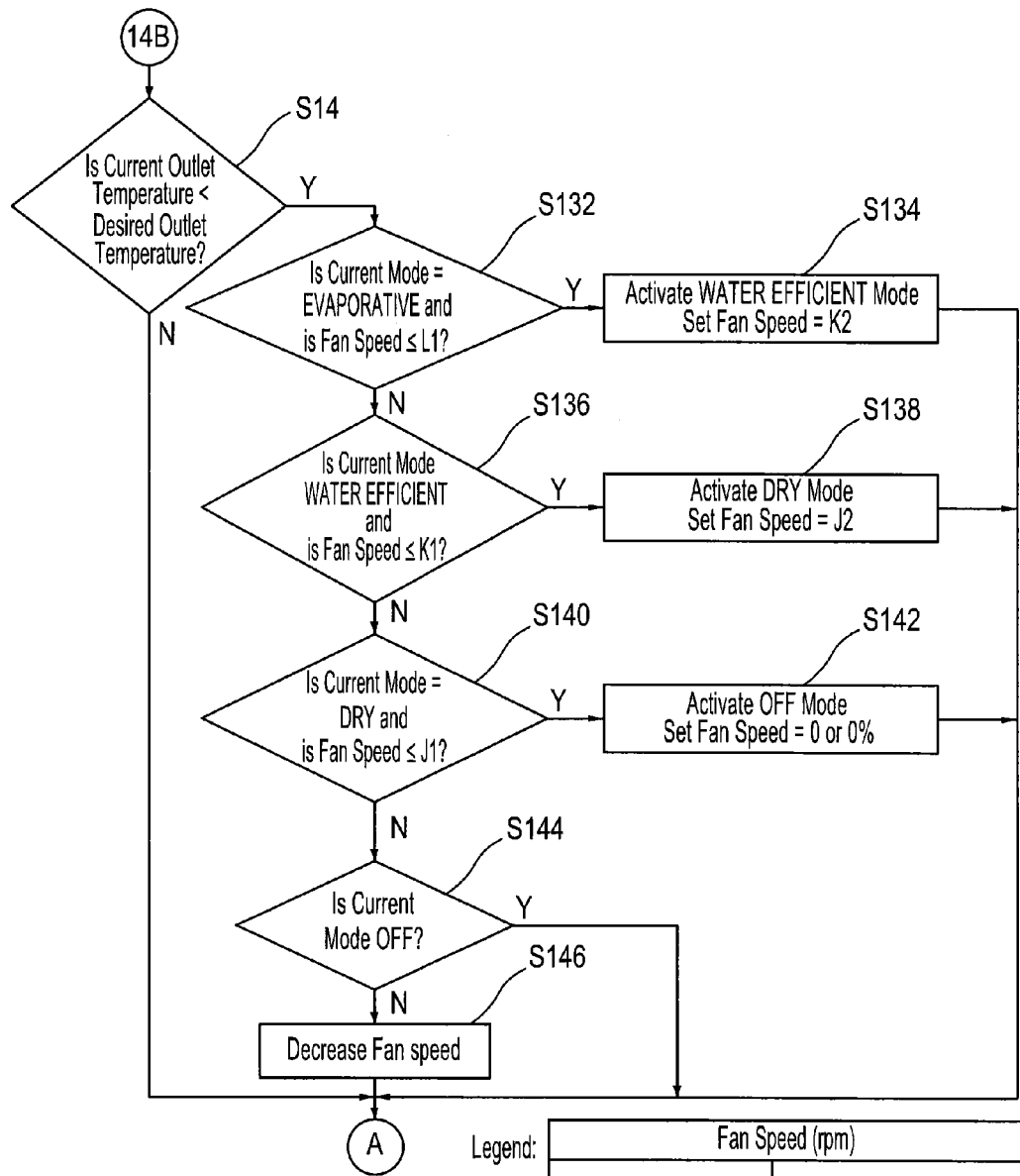
Figure 16A:
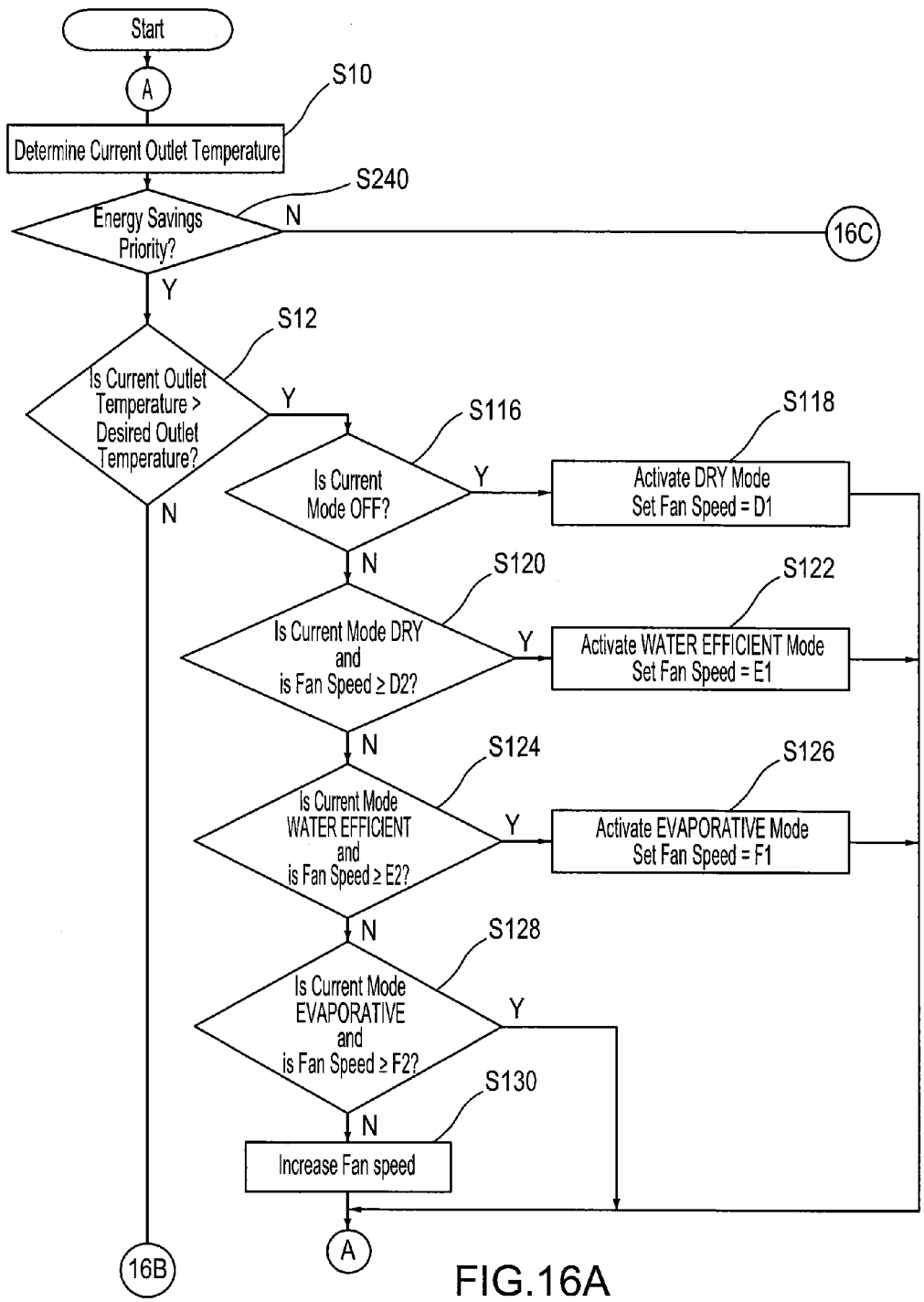
FIGS. 16A-16D are a flow chart of a fourth exemplary embodiment of the method of the present invention.
Figure 16B:
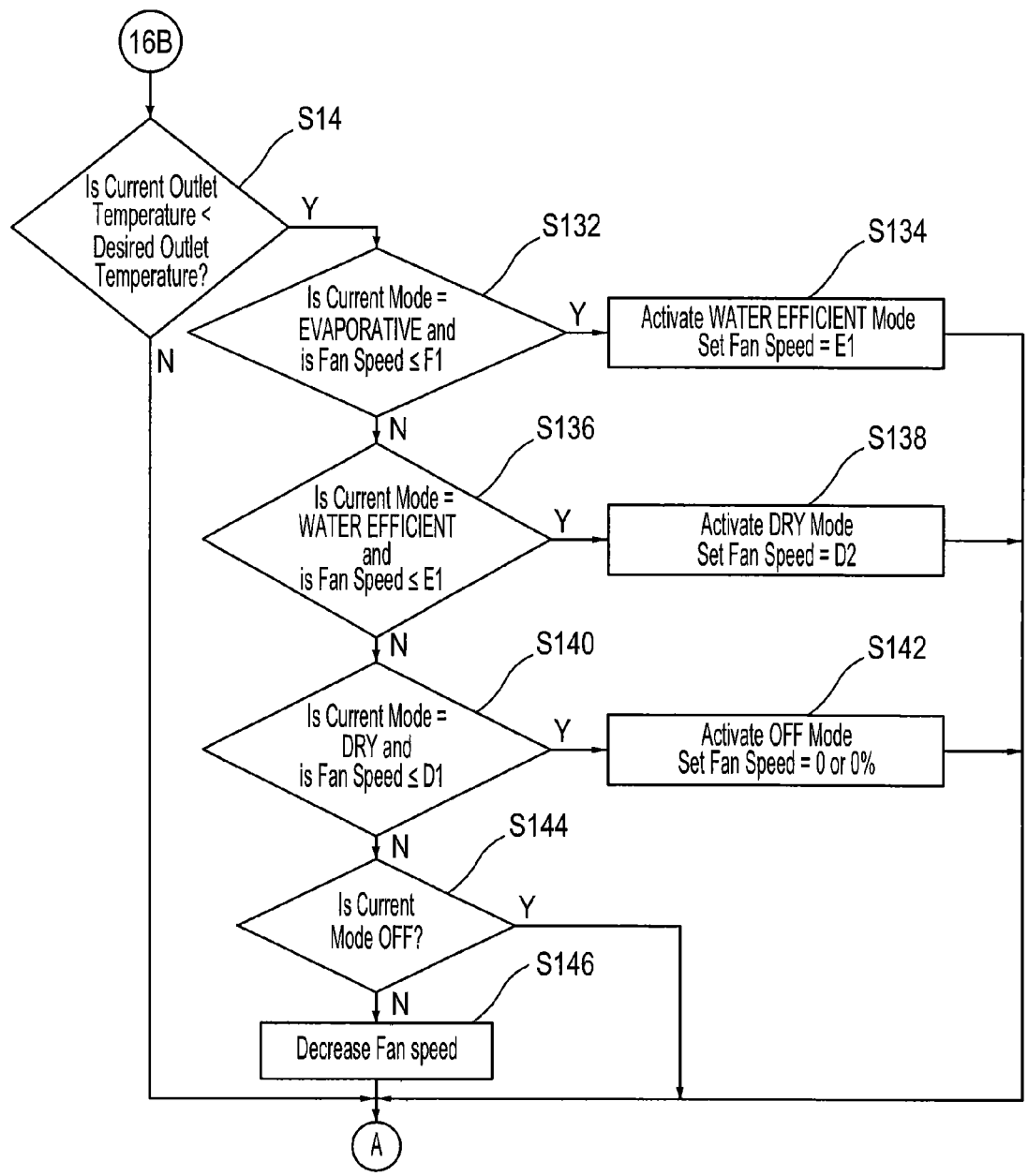
Figure 16C:
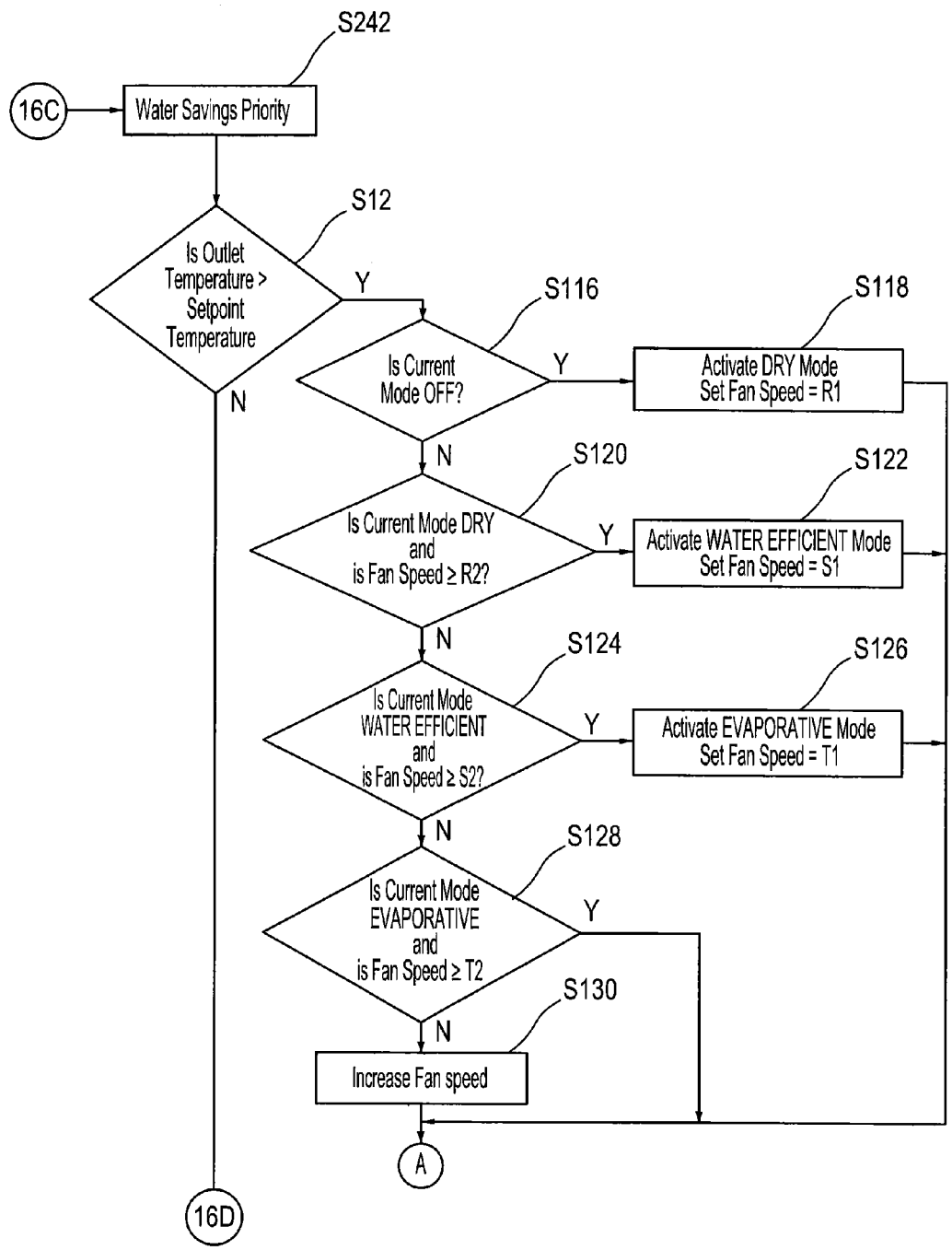
Figure 16D:
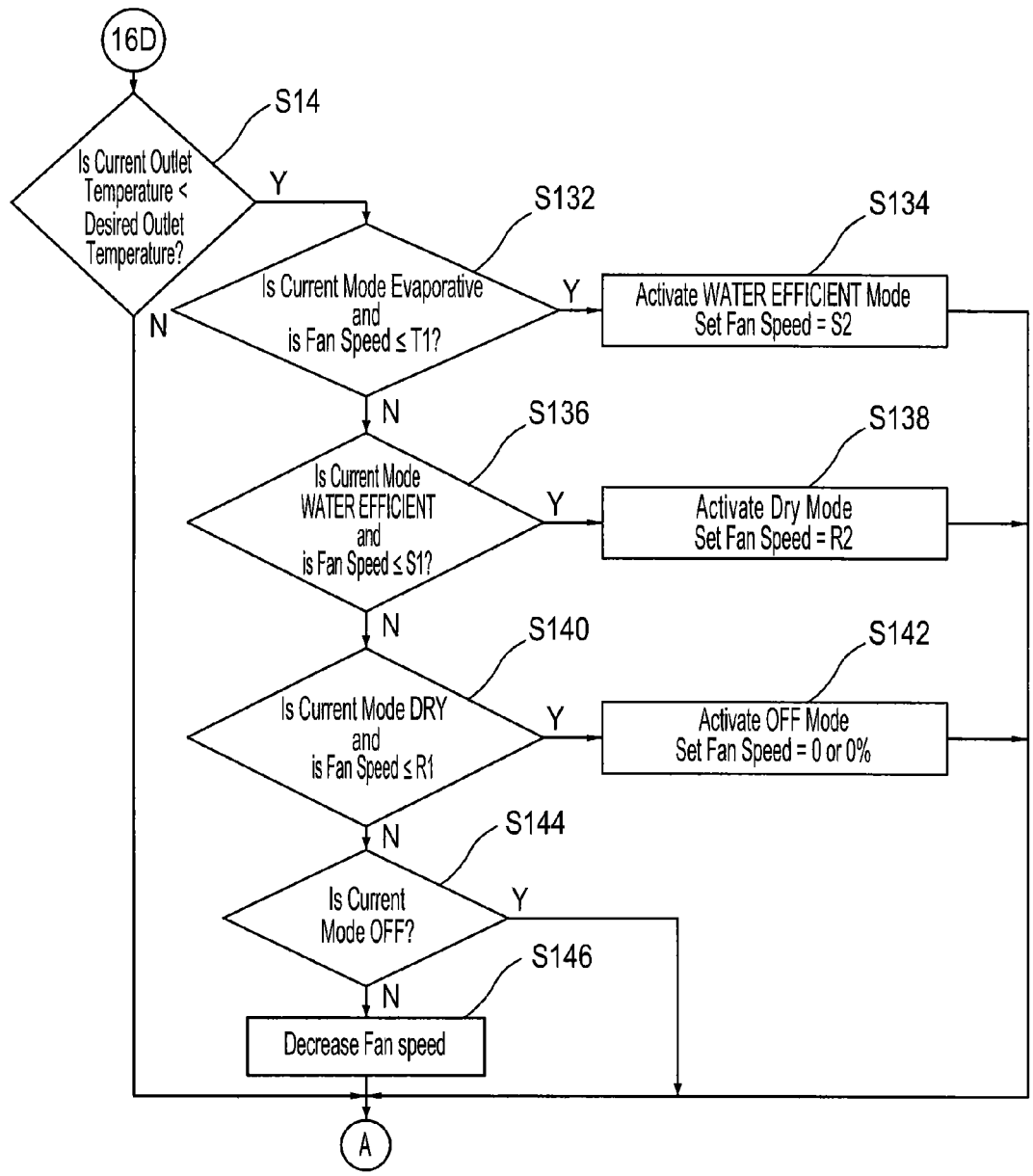

In FIGS. 14A and 14B, if the current outlet temperature COT is greater than the desired outlet temperature DOT (Step S12), Step S116 is executed. Step S116 determines whether the current operating mode is the OFF operating mode. If the current operating mode is the OFF operating mode, then Step S118 is executed. In Step S118, the DRY operating mode is activated and the current fan speed is set at a predetermined dry-mode low set point fan speed J1.

Again with reference to FIGS. 14A and 14B, if the current outlet temperature COT is greater than the desired outlet temperature DOT (Step S12) and after it is determined in Step S116 that the current mode is not off, Step S120 is executed. Step S120 determines whether the current operating mode is the DRY operating mode and whether the current fan speed is greater than or equal to a predetermined dry-mode high set point fan speed J2. If the current operating mode is the DRY operating mode and if the current fan speed is greater than or equal to the predetermined dry-mode high set point fan speed J2, then Step S122 is executed. In Step S122, the WATER EFFICIENT operating mode is activated and the current fan speed is set to a predetermined water-efficient low set point fan speed K1.

As shown in FIGS. 14A and 14B, if the current outlet temperature COT is greater than the desired outlet temperature DOT (Step S12) and after it is determined in Step S120 that the current mode is not dry and the fan speed is not greater than or equal to the predetermined dry-mode high set point fan speed J2, Step S124 is executed. Step S124 determines whether the current operating mode is the WATER EFFICIENT operating mode and whether the current fan speed is greater than or equal to a water-efficient-mode high set point fan speed K2. If the current operating mode is the WATER EFFICIENT operating mode and the current fan speed is greater than or equal to the evaporative-mode high set point fan speed K2, then Step S126 is executed. In Step S126, the EVAPORATIVE operating mode is activated and the current fan speed is set to a predetermined evaporative-mode low set point fan speed L1.

If the current outlet temperature COT is greater than the desired outlet temperature DOT (Step S12) and after it is determined in Step S124 that the current mode is not Water Efficient and the fan speed is not greater than or equal to the predetermined water-efficient-mode high set point fan speed K2, Step S128 is executed. Step S128 determines whether the current operating mode is the EVAPORATIVE operating mode and whether the current fan speed is greater than or equal to a predetermined evaporative-mode high set point fan speed L2. If the current operating mode is the EVAPORATIVE operating mode and the current fan speed is greater than or equal to the predetermined evaporative-mode high set point fan speed L2, then the heat exchanger unit continues to operate in the EVAPORATIVE operating mode with the current fan speed being greater than or equal to the predetermined evaporative-mode high set point fan speed L2.

To summarize, each one of Step S12, Step S116, Step S120, Step S124 and Step S128 described above has been determined to be a "yes" determination and the user-determined fan speeds are summarized in Table 5 as follows:

TABLE 5

| | Fan Speed (rpm) | |
|---|---|---|
| Operating Mode | low set point | high set point |
| DRY | J1 | J2 |
| WATER EFFICIENT | K1 | K2 |
| EVAPORATIVE | L1 | L2 |
| OFF | 0 | 0 | with J1 < J2, K1 < K2 and L1 < L2.

If each one of Step S116, Step S120, Step S124 and Step S128 is determined to be a "no" determination and Step 12 is determined to be a "yes" determination, then Step S130 is executed. In Step S130, the current fan speed is incrementally increased. More specifically, if the current outlet temperature COT is greater than the desired outlet temperature DOT (Step 12) and the heat exchanger unit 110 is not currently operating under any one of the following listed operating conditions, namely:

1. the current operating mode is the OFF operating mode (Step S116);
2. the current operating mode is the DRY operating mode and the current fan speed is greater than or equal to the dry-mode high set point fan speed J2 (Step S120);
3. the current operating mode is the WATER EFFICIENT operating mode and the current fan speed is greater than or equal to the water-efficient-mode high set point fan speed K2 (Step S124); and
4. the current operating mode is the EVAPORATIVE operating mode and the current fan speed is greater than or equal to the evaporative-mode high set point fan speed L2 (Step S128), then the Step S130 of incrementally increasing the fan speed is executed. Thereafter, the method returns to Step S10.

Again, in FIGS. 14A and 14B, if the current outlet temperature COT is less than the desired outlet temperature DOT (Step S14), Step S132 is executed. Step S132 determines whether the current operating mode is the EVAPORATIVE operating mode and the current fan speed is less than or equal to the predetermined evaporative-mode low set point fan speed L1. If the current operating mode is the EVAPORATIVE operating mode and the current fan speed is less than or equal to the predetermined evaporative-mode low set point fan speed L1, then Step S134 is executed. In Step S134, the WATER EFFICIENT operating mode is activated and the current fan speed is set at the predetermined water-efficient-mode high set point fan speed K2.

If the current outlet temperature COT is less than the desired outlet temperature DOT (Step S14) and the current mode is not the EVAPORATIVE operating mode and the fan speed is not less than the predetermined evaporative-mode low set point fan speed L1, Step S136 is executed. Step S136 determines whether the current operating mode is the WATER EFFICIENT operating mode and the current fan speed is less than or equal to the predetermined water-efficient-mode low set point fan speed K1. If the current operating mode is the WATER EFFICIENT operating mode and the current fan speed is less than or equal to the predetermined water-efficient-mode low set point fan speed K1, then Step S138 is executed. In Step S138, the DRY operating mode is activated and the current fan speed is set at the predetermined dry-mode high set point fan speed J2.

Again, with reference to FIGS. 14A and 14B, if the current outlet temperature COT is less than the desired outlet temperature DOT (Step S14) and the current mode is not the Water Efficient operating mode and the fan speed is not less than the predetermined water-efficient-mode low set point fan speed K1, then Step S140 is executed. Step S140 determines whether the current operating mode is the DRY operating mode and whether the current fan speed is less than or equal to the predetermined dry-mode low set point fan speed J1. If the current operating mode is the DRY operating mode and the current fan speed is less than or equal to the dry-mode low set point fan speed J1, the OFF operating mode is activated.

In FIGS. 14A and 14B, if the current outlet temperature COT is less than the desired outlet temperature DOT (Step S14) and the current mode is not the Dry operating mode and the fan speed is not less than the predetermined dry-mode low set point fan speed J1, Step S144 is executed. Step S144 determines whether the current operating mode is the OFF operating mode. If the current operating mode is the OFF operating mode, then the heat exchanger unit 110 continues to operate in the OFF operating mode.

To summarize, each one of Step S14, Step S132, Step S136, Step S140 and Step S144 described above has been determined to be a "yes" determination. If each one of Step S132, Step S136, Step S140 and Step S144 is determined to be a "no" determination and Step 14 is determined to be a "yes" determination, then Step S146 is executed. In Step S146, the current fan speed is incrementally decreased. More specifically, if the current outlet temperature COT is less than the desired outlet temperature DOT (Step S14) and the heat exchanger unit 110 is not currently operating under any one of the following listed operating conditions, namely:

1. the current operating mode is the OFF operating mode (Step S144);
2. the current operating mode is the DRY operating mode and the current fan speed is less than or equal to the dry-mode low set point fan speed J1 (Step S140);
3. the current operating mode is the WATER EFFICIENT operating mode and the current fan speed is less than or equal to the water-efficient-mode low set point fan speed K1 (Step S136); and
4. the current operating mode is the EVAPORATIVE operating mode and the current fan speed is less than or equal to the evaporative-mode low set point fan speed L1 (Step S132), then the Step S146 of incrementally decreasing the fan speed is executed. Thereafter, the method returns to Step S10.

A fourth exemplary embodiment of the method of the present invention is hereinafter described with reference to FIGS. 16A-16D and 17. For the fourth exemplary embodiment of the method of the present invention, the heat exchanger unit 110 (FIGS. 9-12), while operating in the DRY operating mode, WATER EFFICIENT operating mode or the EVAPORATIVE operating mode, operates either in the water savings priority condition or the energy savings priority condition in a similar manner discussed above.

With reference to FIGS. 16A-16D, after Step S10, Step S240 is executed. Step S240 determines whether the energy savings priority condition is to be implemented. If the energy savings priority condition is to be implemented, then Step S12, Step S14 and Steps S116 through S146 are to be executed as described hereinabove but with fan speeds particularly suitable for energy savings as discussed in more detail below. If Step S240 determines that the energy savings priority condition is not to be implemented, then Step S242 is executed. In Step S242, the water saving priority condition is to be implemented. If the water savings priority condition is to be implemented, then Step S12, Step S14 and Steps S116 through S146 are to be executed as described hereinabove but with fan speeds particularly suitable for water savings as discussed in more detail below. However, a skilled artisan would appreciate that Step S240 might determine whether the water savings priority condition is to be implemented and, correspondingly, Step S242 would implement the energy savings priority condition without departing from the spirit of the invention.

As shown in FIG. 17, in the energy savings priority condition, the predetermined low set point fan speed is an energy-savings dry-mode low set point fan speed D1, an energy-savings water-efficient-mode low set point fan speed E1 or an energy-savings evaporative-mode low set point fan speed F1 and the predetermined high set point fan speed is a water-savings dry-mode high set point fan speed D2, an energy-savings water-efficient-mode high set point fan speed E2 or an energy-savings evaporative-mode high set point fan speed F2. In the water savings priority condition, the predetermined low set point fan speed is a water-savings dry-mode low set point fan speed R1, a water-savings water-efficient-mode low set point fan speed S1 or a water-savings evaporative-mode low set point fan speed T1 and the predetermined high set point fan speed is a water-savings dry-mode high set point fan speed R2, a water-savings water-efficient-mode high set point fan speed S2 or a water-savings evaporative-mode high set point fan speed T2.

The user-determined fan speeds for the second exemplary embodiment of the method of the present invention are summarized in Table 6 as follows:

TABLE 6

| | Fan Speed (rpm) | | | |
|---|---|---|---|---|
| | Energy Savings Priority | | Water Savings Priority | |
| Operating Mode | low set point | high set point | low set point | high set point |
| DRY | D1 | D2 | R1 | R2 |
| WATER EFFICIENT | E1 | E2 | S1 | S2 |
| EVAPORATIVE | F1 | F2 | T1 | T2 |
| OFF | 0 | 0 | 0 | 0 | and D1 < D2, E1 < E2, F1 < F2, R1 < R2, S1 < S2 and T1 < T2.

It is appreciated that, in the WATER EFFICIENT operating mode, the heat exchanger unit 110 has more thermal capacity than in the DRY operating mode while evaporating less water than in the EVAPORATIVE operating mode.

Figure 18:
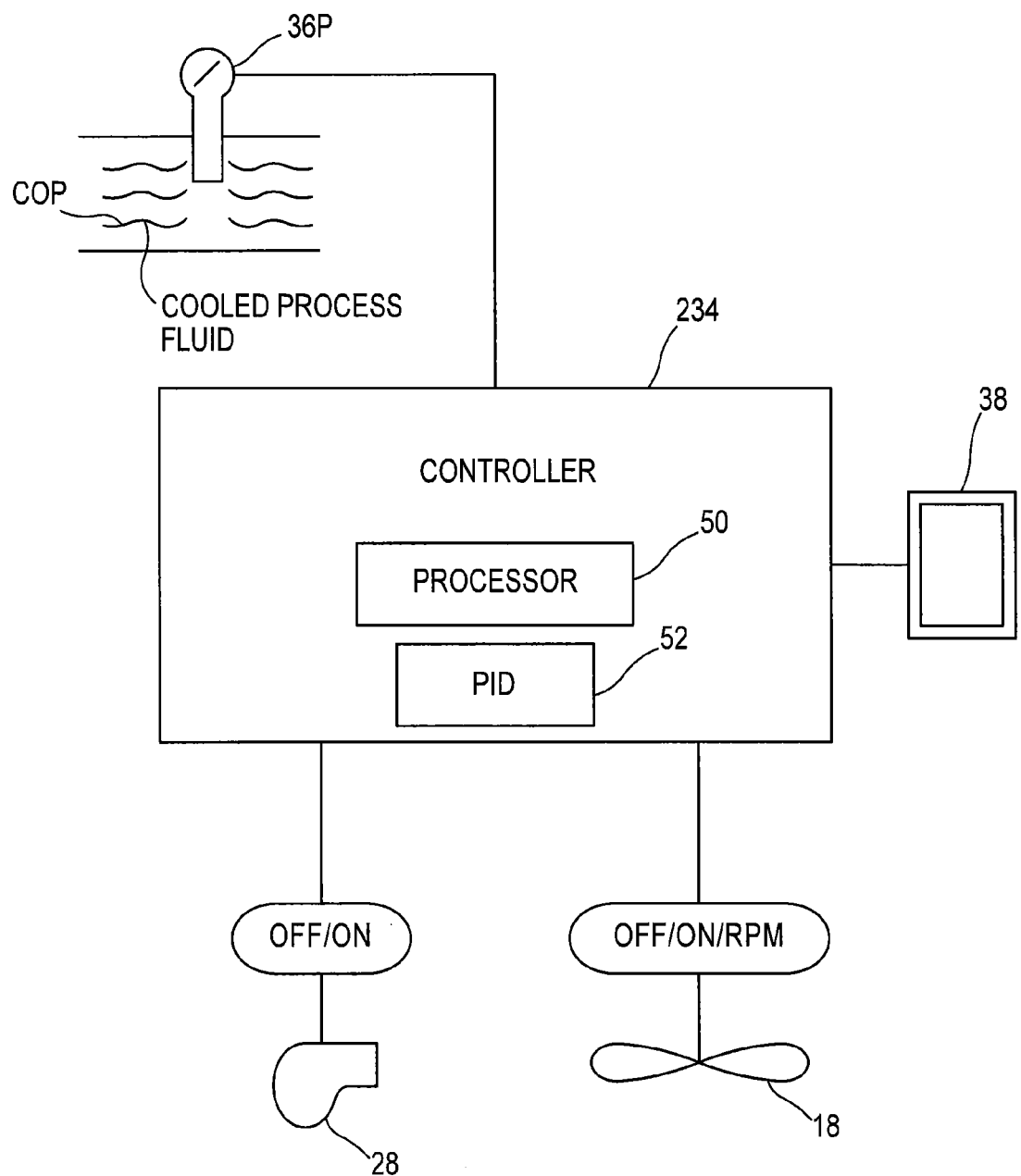
FIG. 18 is a diagrammatical view of a controller interconnected with a pressure sensor, the pump, the fan and the interface that implements the fifth exemplary embodiment of the method of the present invention.

A fifth exemplary embodiment of the method of the present invention is described with reference to FIGS. 18-20. Throughout the discussion of the first through the fourth exemplary embodiments of the present invention, "temperature" is the physical characteristic of the process fluid being monitored and controlled. Thus, if the current physical characteristic to be monitored and controlled is a current outlet temperature then the desired physical characteristic is a desired outlet temperature and if the current physical characteristic to be monitored and controlled is pressure then the desired physical characteristic is a desired outlet pressure. As shown in FIG. 20, a predetermined target outlet pressure TOP in psi and a predetermined dead band pressure DBP in psi are determined by the user and, as a result, the desired outlet pressure DOP in psi is determined therefrom.

Figure 19A:
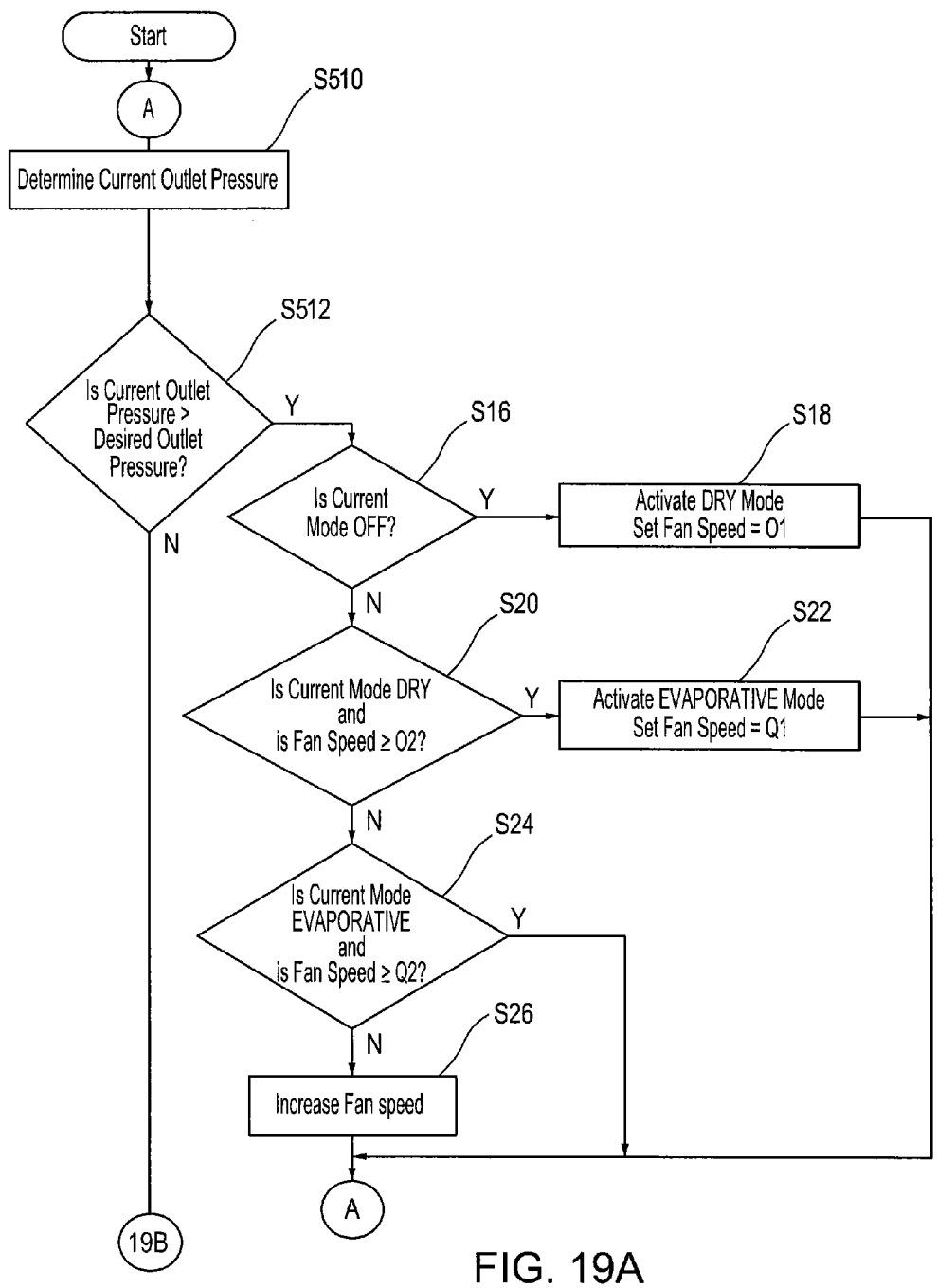
FIGS. 19A and 19B are a flow chart of the fifth exemplary embodiment of the method of the present invention.
Figure 19B:
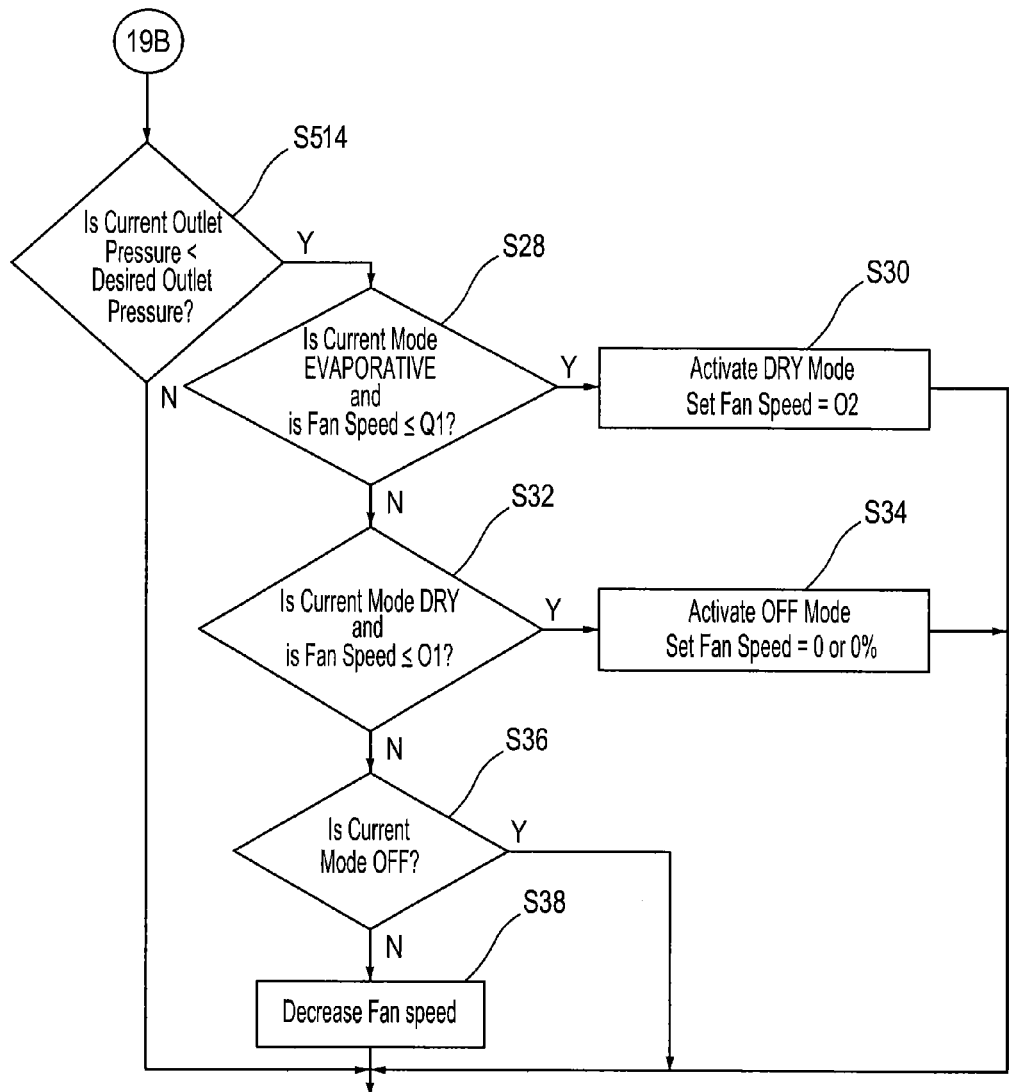

The flow chart in FIGS. 19A and 19B are similar to the flow chart in FIGS. 5A and 5B. However, in lieu of Step S10, Step S510 is executed. Step S510 determines the current outlet pressure. In lieu of Step S12, Step S512 is executed. Step S512 determines whether the current outlet pressure is greater than the desired outlet pressure. In lieu of Step S14, Step S514 is executed. Step S514 determines whether the current outlet pressure is less than the desire outlet pressure. Steps S16 through S38 remain the same except for the high and low set point fan speeds.

The high and low set point fan speeds are summarized in Table 7 as follows:

TABLE 7

| | Fan Speed (rpm) | |
|---|---|---|
| Operating Mode | low set point | high set point |
| DRY | O1 | O2 |
| EVAPORATIVE | Q1 | Q2 |
| OFF | 0 | 0 | with O1 < O2 and Q1 < Q2.

For the fifth exemplary embodiment of the method of the present invention, "pressure" is the physical characteristic of the process fluid to be monitored and controller. In FIG. 18, the sensor 36 (as shown in FIGS. 1-3) is a pressure sensor 36P and a controller 234 is in communication with the pressure sensor 36P. In this case, the heat exchanger unit 10 is employed as a "condenser" also known as an "evaporative condenser".

The controller 34, 134 or 234 includes a processor 50 and a proportional integral derivative (PID) 52. As is known in the art, the proportional integral derivative (PID) 52 calculates the actual incremental increases or decreases in fan speed discussed above for the embodiments of the present invention. The controller may be constituted of program code, which is stored on a computer-readable medium that is executed by the central processing unit (CPU) to provide the operations described herein. However, it may alternatively comprise of hardware, firmware, or combinations of software, hardware, and firmware. For example, the controller may be a computer that contains the internal components of a read only memory (ROM), random access memory (RAM), graphics processor, CPU, network interface card, etc. However, the controller is not limited to a computer. Other examples include a personal computer, a mobile phone, a hand-held device, a laptop personal computer, device management computer or any other electronic device that has at least a processor and interface. Thus, the controller may be constituted of program code; a simple device, such as a processor and interface; a complex device, such as a high-tech supercomputer with multiple processors and multiple interfaces; or various other devices that comprise combinations of software, hardware, and firmware.

The interface may be any communication technology that allows a processor to receive or send data, such as a Graphic User Interface (GUI); a touch screen; a sensor; a keypad; a keyboard; a network interface for a IP WAN/LAN network, WiFi network, Bluetooth, 3G wireless, 4G wireless, an IR interface, satellite, or microwaves; or various other interfaces.

The processor may be any processing unit that calculates, computes or counts signals received from an interface or that outputs a computation or calculation result to an interface, such as CPU, graphics processor, multiplexer, decoder, shift-register, or various other processors.

The present invention, may, however, be embodied in various different forms and should not be construed as limited to the exemplary embodiments set forth herein. Rather, these exemplary embodiments are provided so that this disclosure will be thorough and complete and will fully convey the scope of the present invention to those skilled in the art. For instance, it is possible that two fan speeds, although designed by different alphanumeric symbols, could be the same fan speed. Additionally, the steps executed by the method are not necessary executed in the order that is illustrated in the drawing figures. For instance, instead of Step S12 being executed before Step S14, Step S14 could be executed before Step S12 and Steps S16, S20, S24 and S26 could be executed in any order inclusive of the order shown in the drawing figures. Further, rather than the incremental increase/decrease in fan speed being set as a percentage of maximum fan speed in rpm, the user or factory operator might establish a fixed rpm. (Note: The incremental increase/decrease of the fan speed is determined by the PID control. It is a function of the difference between the target and current outlet temperature.) Additionally, one of ordinary skill in the art would appreciate that the dead band temperature could be established as zero.

What is claimed is:

1. A method for operating a heat exchanger unit with a process fluid flowing therethrough and having a pump and a fan rotatable in a range of fan speeds, the heat exchanger unit having a plurality of modes including an OFF mode in which both the pump and the fan are in an OFF state, a DRY operating mode in which the fan is in an ON state and the pump is in the OFF state and an EVAPORATIVE operating mode in which both the fan and the pump are in the ON state, one of the plurality of modes being a current mode of the heat exchanger unit, the range of fan speeds including a DRY mode low set point fan speed, a DRY mode high set point fan speed being higher than the DRY mode low set point fan speed, an EVAPORATIVE mode low set point fan speed and an EVAPORATIVE mode high set point fan speed being higher than the EVAPORATIVE mode low set point fan speed, the method comprising the steps of:
   determining a current physical characteristic of the process fluid at or adjacent a process fluid outlet of the heat exchanger unit;
   predetermining a desired physical characteristic of the process fluid at which the process fluid is desired to exit the heat exchanger unit; and
   determining the current mode of the heat exchanger and when the current physical characteristic of the process fluid is greater than the desired physical characteristic of the process fluid:
      increasing the fan speed when determined that the current mode is not the OFF mode, is not the DRY operating mode with the fan speed in the DRY operating mode being greater than or equal to the DRY mode high set point fan speed and is not the EVAPORATIVE operating mode with the fan speed in the EVAPORATIVE operating mode being greater than or equal to the EVAPORTIVE mode high set point fan speed;
      changing to the DRY operating mode with the DRY mode low set point fan speed when the current mode is determined as the OFF mode;
      changing to the EVAPORATIVE operating mode with the EVAPORATIVE mode low set point fan speed when the current mode is determined as the DRY operating mode with the fan speed in the DRY mode being greater than or equal to the DRY mode high set point fan speed;
   and
   when the current physical characteristic of the process fluid is less than the desired physical characteristic of the process fluid:
      decreasing the fan speed when determined that the current mode is not the EVAPORATIVE mode with the fan speed in the EVAPORATIVE mode being less than or equal to the EVAPORATIVE mode low set point fan speed, is not the DRY operating mode with the fan speed in the DRY operating mode being less than or equal to the DRY mode low set point fan speed and is not the OFF mode;
      changing to the DRY operating mode with the DRY mode high set point fan speed when the current mode is determined as the EVAPORATIVE mode with fan speed in the EVAPORATIVE mode being less than or equal to the EVAPORATIVE mode low set point fan speed;
      changing to the OFF mode when the current mode is determined as the DRY mode with the fan speed in the DRY mode being less than or equal to the DRY mode low set point fan speed.

2. The method according to claim 1, wherein the current physical characteristic is temperature or pressure and the desired physical characteristic is an outlet temperature if the current physical characteristic is temperature and an outlet pressure if the current physical characteristic is pressure.

3. The method according to claim 1, wherein the heat exchanger unit, while operating in the DRY operating mode or the EVAPORATIVE operating mode, operates in one of a water savings priority condition or an energy savings priority condition such that, in the water savings priority condition, the heat exchanger unit is optimized to save water in favor over energy savings and, in the energy savings priority condition, the heat exchanger is optimized to save energy in favor over water savings.

4. The method according to claim 3, wherein,
   in the water savings priority condition, a predetermined low set point fan speed is a water-savings dry-mode low set point fan speed or a water-savings evaporative-mode low set point fan speed and a predetermined high set point fan speed is a water-savings dry-mode high set point fan speed or a water-savings evaporative-mode high set point fan speed and
   in the energy savings priority condition, the predetermined low set point fan speed is an energy-savings dry-mode low set point fan speed or an energy-savings evaporative-mode low set point fan speed and the predetermined high set point fan speed is an energy-savings dry-mode high set point fan speed or an energy-savings evaporative-mode high set point fan speed.

5. A controller operative to implement the method according to claim 1.

6. A method for operating a heat exchanger unit with a process fluid flowing therethrough and having a first pump, a second pump and a fan rotatable in a range of fan speeds, the heat exchanger unit having a plurality of modes including an OFF mode in which the first pump, the second pump and the fan are in an OFF state, a DRY operating mode in which the fan is in an ON state and the first pump and the second pump are in the OFF state, an EVAPORATIVE operating mode in which the fan, the first pump and the second pump are in the ON state and a WATER EFFICIENT operating mode in which the fan and the first pump are in the ON state and the second pump is in the OFF state, one of the plurality of modes being a current mode of the heat exchanger unit, the range of fan speeds including a DRY mode low set point fan speed, a DRY mode high set point fan speed being higher than the DRY mode low set point fan speed and an EVAPORATIVE mode low set point fan speed, an EVAPORATIVE mode high set point fan speed being higher than the EVAPORATIVE mode low set point fan speed, a WATER EFFICIENT mode low set point fan speed and a WATER EFFICIENT mode high set point fan speed being higher than the WATER EFFICIENT mode low set point fan speed, the method comprising the steps of:

determining a current physical characteristic of the process fluid at or adjacent a process fluid outlet of the heat exchanger unit;

predetermining a desired physical characteristic of the process fluid at which the process fluid is desired to exit the heat exchanger unit; and determining the current mode of the heat exchanger and when the current physical characteristic of the process fluid is greater than the desired physical characteristic of the process fluid:

increasing the fan speed when determined that the current mode is not the OFF mode, is not the DRY operating mode with the fan speed in the DRY operating mode being greater than or equal to the DRY mode high set point fan speed, is not the WATER EFFICIENT mode with the fan speed in the WATER EFFICIENT mode being greater than or equal to the WATER EFFICIENT mode high set point fan speed and is not the EVAPORATIVE operating mode with the fan speed in the EVAPORATIVE operating mode being greater than or equal to the EVAPORATIVE mode high set point fan speed;

changing to the DRY operating mode with the DRY mode low set point fan speed when the current mode is determined as the OFF mode;

changing to the WATER EFFICIENT operating mode with the WATER EFFICIENT mode low set point fan speed when the current mode is determined as the DRY operating mode with the fan speed in the DRY mode being greater than or equal to the DRY mode high set point fan speed;

changing to the EVAPORATIVE operating mode with the EVAPORATIVE mode low set point fan speed when the current mode is determined as the WATER EFFICIENT operating mode with the fan speed in the WATER EFFICIENT mode being greater than or equal to the WATER EFFICIENT mode high set point fan speed;

and when the current physical characteristic of the process fluid is less than the desired physical characteristic of the process fluid:

decreasing the fan speed when determined that the current mode is not the EVAPORATIVE mode with the fan speed in the EVAPORATIVE mode being less than or equal to the EVAPORATIVE mode low set point fan speed, is not the WATER EFFICIENT mode with the fan speed in the WATER EFFICIENT mode being less than or equal to the WATER EFFICIENT mode low set point fan speed, is not the DRY operating mode with the fan speed in the DRY operating mode being less than or equal to the DRY mode low set point fan speed and is not the OFF mode;

changing to the WATER EFFICIENT operating mode with the WATER EFFICIENT mode high set point fan speed when the current mode is determined as the EVAPORATIVE mode with fan speed in the EVAPORATIVE mode being less than or equal to the EVAPORATIVE mode low set point fan speed;

changing to the DRY operating mode with the DRY mode high set point fan speed when the current mode is determined as the WATER EFFICIENT mode with the fan speed in the WATER EFFICIENT mode being less than or equal to the WATER EFFICIENT mode low set point fan speed;

changing to the OFF mode when the current mode is determined as the DRY mode with the fan speed in the DRY mode being less than or equal to the DRY mode low set point fan speed.

7. The method according to claim 6, wherein the current physical characteristic is one of temperature and pressure and the desired physical characteristic is one of an outlet temperature if the current physical characteristic is temperature and an outlet pressure if the current physical characteristic is pressure.

8. The method according to claim 6, wherein the heat exchanger unit, while operating in the DRY operating mode, the WATER EFFICIENT operating mode or the EVAPORATIVE operating mode, operates in one of a water savings priority condition or an energy savings priority condition such that, in the water savings priority condition, the heat exchanger unit is optimized to save water in favor over energy savings, in the energy savings priority condition, the heat exchanger unit is optimized to save energy in favor over water savings.

9. The method according to claim 8, wherein, in the water savings priority condition, a predetermined low set point fan speed is a water-savings dry-mode low set point fan speed, a water-savings water-efficient-mode low set point fan speed or a water-savings evaporative-mode low set point fan speed and a predetermined high set point fan speed is a water-savings dry-mode high set point fan speed, a water-savings water-efficient-mode high set point fan speed or a water-savings evaporative-mode high set point fan speed;

in the energy savings priority condition, the predetermined low set point fan speed is an energy-savings dry-mode low set point fan speed, an energy-savings water-efficient-mode low set point fan speed or an energy-savings evaporative-mode low set point fan speed and the predetermined high set point fan speed is a water-savings dry-mode high set point fan speed, an energy-savings water-efficient-mode high set point fan speed or an energy-savings evaporative-mode high set point fan speed.

10. A controller operative to implement the method according to claim 6.

* * * * *